US008451525B2

(12) United States Patent
Kaifu et al.

(10) Patent No.: US 8,451,525 B2
(45) Date of Patent: May 28, 2013

(54) OPTICAL APPARATUS AND IMAGING APPARATUS

(75) Inventors: Keita Kaifu, Tokyo (JP); Kazuhiro Tanaka, Tokyo (JP); Hiroshi Koizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 12/805,182

(22) Filed: Jul. 16, 2010

(65) Prior Publication Data

US 2011/0051213 A1 Mar. 3, 2011

(30) Foreign Application Priority Data

Sep. 3, 2009 (JP) .................................. 2009-203854

(51) Int. Cl.
*G02B 26/02* (2006.01)

(52) U.S. Cl.
USPC ........................................................ 359/228

(58) Field of Classification Search
USPC .................... 359/228, 296, 665, 886
See application file for complete search history.

(56) References Cited

U.S. PATENT DOCUMENTS

| 2007/0236803 A1 | 10/2007 | Ohishi et al. |
| 2007/0246365 A1 | 10/2007 | Ohishi et al. |
| 2008/0174846 A1* | 7/2008 | Morozumi et al. ........... 359/228 |
| 2009/0034052 A1* | 2/2009 | Hagood et al. ................ 359/290 |

FOREIGN PATENT DOCUMENTS

| JP | 2007-209112 | 8/2007 |
| JP | 2007-264278 | 10/2007 |

* cited by examiner

*Primary Examiner* — Jennifer L. Doak
(74) *Attorney, Agent, or Firm* — Rader, Fishman & Grauer PLLC

(57) ABSTRACT

An optical apparatus includes: a sealing case having chambers partitioned by a partition wall; a polar liquid having polarity and a nonpolar liquid having no polarity which are respectively sealed in a predetermined amount in each of the chambers; and electrodes pulling the polar liquid by an electrowetting phenomenon upon application of a driving voltage. One of the polar liquid and the nonpolar liquid is colored with a color having a light-blocking property, and the other has a light-transmitting property, at least a part of the partition wall is positioned in an optically effective area including the optical axis, and when a driving voltage is applied to a predetermined electrode among the electrodes, the polar liquid is moved in the chamber between closed and open positions where the optically effective area is closed and open, respectively.

7 Claims, 25 Drawing Sheets

OPTICAL APPARATUS AND IMAGING APPARATUS

BACKGROUND OF THE INVENTION

1. Field of the Invention

The present invention relates to a technical field of an optical apparatus and an imaging apparatus. More specifically, the present invention relates to a technical field for accelerating an operation of adjusting the quantity of light incident to an image sensing device while ensuring reliability of the operation with a configuration in which a polar liquid and a nonpolar liquid are sealed in a plurality of chambers being divided by a partition wall.

2. Description of the Related Art

Imaging apparatuses of various types, such as video cameras or still cameras, are provided with an optical apparatus that adjusts the quantity of light incident to an image sensing device such as a CCD (Charge Coupled Device) or a CMOS (Complementary Metal-Oxide Semiconductor).

As examples of the optical apparatus, a mechanical iris mechanism, a mechanical shutter mechanism, and the like, in which a light quantity adjustment operation is performed by operating a singular, or plural, movable blade, are known.

However, the iris mechanism or the like that adjusts the quantity of light by operating the movable blade is necessary to have a driving mechanism and a driving source for operating the movable blade. Thus, it is difficult to achieve a reduction in the size of the imaging apparatus.

In addition, the adjustment of the quantity of light using the movable blade may generate noise during the movement of the movable blade. Moreover, refraction of light may occur in a so-called small aperture state where the quantity of light is limited by the movable blade to decrease the size of an opening through which light passes. Thus, resolution of a resulting image decreases. Particularly, in recent years, the pitch of pixels of the image sensing device has been decreasing, and it is therefore desirable to have a new optical apparatus for ensuring constant optical performance.

In order to solve the problems described above, as a substitute for the mechanical optical apparatus, an optical apparatus that adjusts the quantity of light by moving a polar liquid using an electrowetting phenomenon has been proposed in JP-A-2007-209112 and JP-A-2007-264278, for example.

The optical apparatus using the electrowetting phenomenon has a polar liquid and a nonpolar liquid which are sealed in a predetermined amount in respective chambers. When a voltage is applied to one electrode, the polar liquid is pulled towards the electrode and moved in a first direction. When a voltage is applied to the other electrode, the polar liquid is pulled towards the electrode and moved in a second direction.

In this way, by pulling the polar liquid towards the electrode to which the voltage is applied, an optical path is interrupted, for example, by the polar liquid when the polar liquid is moved in the first direction. On the other hand, the optical path is opened by the polar liquid when the polar liquid is moved in the second direction. Thus, the quantity of light is adjusted.

The optical apparatus disclosed in JP-A-2007-209112 accelerates the movement of the polar liquid by causing an electric field generated by the voltage applied to the electrode to act on a large area of the polar liquid and thus increasing the force acting on the polar liquid.

In addition, the optical apparatus disclosed in JP-A-2007-264278 has two polar liquids sealed in respective chambers and applies an electric field to each of the two polar liquids to move the two polar liquids in directions towards and away from each other so that they are repeatedly separated and combined.

SUMMARY OF THE INVENTION

However, although the optical apparatus disclosed in JP-A-2007-209112 accelerates the movement of the polar liquid by causing the electric field to act on a large area of the polar liquid, it is necessary to increase the volume of the polar liquid in order to apply the electric field to a large area.

Therefore, the size of the chamber increases as the volume of the polar liquid increases, thus making it difficult to achieve a reduction in the size of the imaging apparatus. In addition, the increased weight resulting from the increased volume of the polar liquid decelerates the movement of the polar liquid. Thus, it is difficult to accelerate the movement.

In addition, although the optical apparatus disclosed in JP-A-2007-264278 accelerates the movement of the polar liquid by using two polar liquids, it is difficult to divide the two combined polar liquids evenly. When the two combined polar liquids are divided unevenly, a difference may occur in the movement speed of the two polar liquids. Moreover, there is another problem in that the reliability in dividing permanently the combined polar liquids is low.

It is therefore desirable to provide an optical apparatus and an imaging apparatus capable of accelerating a light quantity adjustment operation while ensuring reliability of the operation.

According to an embodiment of the present invention, there is provided an optical apparatus which includes: a sealing case having a plurality of chambers partitioned by a partition wall; a polar liquid having polarity and a nonpolar liquid having no polarity which are respectively sealed in a predetermined amount in each of the chambers; and a plurality of electrodes pulling the polar liquid by an electrowetting phenomenon upon application of a driving voltage. One of the polar liquid and the nonpolar liquid is colored with a color having a light-blocking property, and the other has a light-transmitting property. At least a part of the partition wall is positioned in an optically effective area including an optical axis. When a driving voltage is applied to a predetermined electrode among the plurality of electrodes, the polar liquid is moved in the chamber between a closed position where the optically effective area is closed and an open position where the optically effective area is open.

Therefore, in the optical apparatus, when the driving voltage is applied to the electrode, the polar liquid is moved in each of the chambers in a direction where it is pulled towards the electrode to which the driving voltage is applied.

In an embodiment of the optical apparatus, the thickness direction of the partition wall may be perpendicular to the optical axis, and the partition wall may have a thickness of 30 μm or smaller.

By setting the thickness of the partition wall to be 30 μm or smaller, the effect on resolution of the presence of the partition wall in the optically effective area is suppressed.

In an embodiment of the optical apparatus, the thickness direction of the partition wall is perpendicular to the optical axis, and a distance between the optical axis and the center of a surface of the partition wall perpendicular to the optical axis may be set to be 90 μm or smaller.

By setting the distance between the optical axis and the center of the surface of the partition wall perpendicular to the optical axis to be 90 μm or smaller, the effect on resolution of the presence of the partition wall in the optically effective area is suppressed.

In an embodiment of the optical apparatus, the plurality of electrodes may be made up of a first electrode that moves the polar liquid in a direction towards the optical axis and a second electrode that moves the polar liquid in a direction away from the optical axis, and the first electrode may be used as a common electrode for the polar liquids sealed in the respective chambers.

By using the first electrode as the common electrode for the polar liquids sealed in the respective chambers, it is not necessary to arrange the first electrode in each of the chambers.

According to another embodiment of the present invention, there is provided an imaging apparatus which includes: an image sensing device that generates an image by photo-electrically converting light incident thereto; a sealing case having a plurality of chambers partitioned by a partition wall whose thickness direction is perpendicular to an optical axis of the light incident to the image sensing device; a polar liquid having polarity and a nonpolar liquid having no polarity which are respectively sealed in a predetermined amount in each of the chambers; and a plurality of electrodes pulling the polar liquid by an electrowetting phenomenon upon application of a driving voltage. One of the polar liquid and the nonpolar liquid is colored with a color having a light-blocking property, and the other has a light-transmitting property. At least a part of the partition wall is positioned in an optically effective area including the optical axis. When a driving voltage is applied to a predetermined electrode among the plurality of electrodes, the polar liquid is moved in the chamber between a closed position where the optically effective area is closed and an open position where the optically effective area is open.

Therefore, in the imaging apparatus, when the driving voltage is applied to the electrode, the polar liquid is moved in each of the chambers in a direction where it is pulled towards the electrode to which the driving voltage is applied.

The optical apparatus according to the embodiment of the present invention includes: a sealing case having a plurality of chambers partitioned by a partition wall whose thickness direction is perpendicular to an optical axis; a polar liquid having polarity and a nonpolar liquid having no polarity which are respectively sealed in a predetermined amount in each of the chambers; and a plurality of electrodes pulling the polar liquid by an electrowetting phenomenon upon application of a driving voltage. One of the polar liquid and the nonpolar liquid is colored with a color having a light property, and the other has a light-transmitting property. At least a part of the partition wall is positioned in an optically effective area including the optical axis. When a driving voltage is applied to a predetermined electrode among the plurality of electrodes, the polar liquid is moved in the chamber between a closed position where the optically effective area is closed and an open position where the optically effective area is open.

Therefore, the respective polar liquids in the respective chambers are allowed to move, and thus, reliability of the movement of the polar liquid can be improved. Moreover, the volume (weight) of the respective polar liquids sealed in the respective chambers decreases, and thus, the movement of the polar liquid can be accelerated.

According to one embodiment of the present invention, since the thickness of the partition wall is set to be 30 μm or smaller, it is possible to obtain a good image or video in which the partition wall has little effect on resolution.

According to one embodiment of the present invention, since the distance between the optical axis and the center of the surface of the partition wall perpendicular to the optical axis is set to be 90 μm or smaller, it is possible to obtain a good image or video in which the partition wall has little effect on resolution.

According to one embodiment of the present invention, the plurality of electrodes may be made up of a first electrode that moves the polar liquid in a direction towards the optical axis and a second electrode that moves the polar liquid in a direction away from the optical axis, and the first electrode may be used as a common electrode for the polar liquids sealed in the respective chambers.

Therefore, it is possible to decrease the number of electrodes and wirings, simplify a mechanism, and achieve a reduction in the manufacturing costs.

The imaging apparatus according to the embodiment of the present invention includes: an image sensing device that generates an image by photo-electrically converting light incident thereto; a sealing case having a plurality of chambers partitioned by a partition wall; a polar liquid having polarity and a nonpolar liquid having no polarity which are respectively sealed in a predetermined amount in each of the chambers; and a plurality of electrodes pulling the polar liquid by an electrowetting phenomenon upon application of a driving voltage. One of the polar liquid and the nonpolar liquid is colored with a color having a light-blocking property, and the other has a light-transmitting property. At least a part of the partition wall is positioned in an optically effective area including the optical axis. When a driving voltage is applied to a predetermined electrode among the plurality of electrodes, the polar liquid is moved in the chamber between a closed position where the optically effective area is closed and an open position where the optically effective area is open.

Therefore, the respective polar liquids in the respective chambers are allowed to move, and thus, reliability of the movement of the polar liquid can be improved. Moreover, the volume (weight) of the respective polar liquids sealed in the respective chambers decreases, and thus, the movement of the polar liquid can be accelerated.

DESCRIPTION OF THE PREFERRED EMBODIMENTS

Embodiments of the present invention will be described in connection with the accompanying drawings.

In the embodiments below, an imaging apparatus according to the present invention is applied to a digital camera, and an optical apparatus according to the present invention is applied to an optical apparatus provided to the digital camera.

It should be noted that the applicability of the present invention is not limited to the digital camera and the optical apparatus provided to the digital camera. The present invention can be broadly applied to various other imaging apparatuses such as a video camera and an optical apparatus provided to these various imaging apparatuses.

In the description below, the directions front, rear, up, down, left, and right will be referred to as seen by a photographer (user) of a digital camera at the time of capturing an image. Therefore, a subject side will be referred to as the front side, and the photographer side will be referred to as the rear side.

It should be noted that the directions front, rear, up, down, left, and right are only for the convenience of the description, and the embodiments of the invention are not limited to the directions.

General Configuration of Imaging Apparatus

Figure 1:
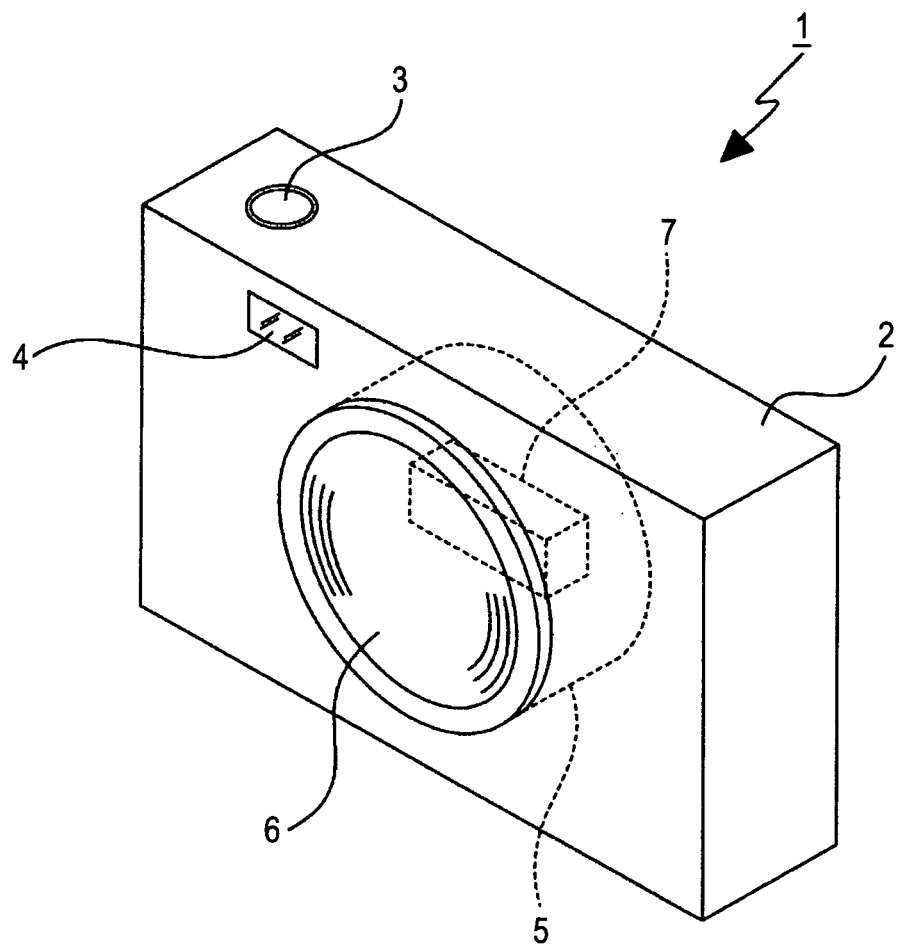
FIG. 1 is a schematic perspective view of an imaging apparatus, showing an embodiment of the present invention together with FIGS. 2 to 26.

An imaging apparatus (digital camera) 1 is formed, for example, in a box-like shape which is flat on the front and rear, and necessary components are arranged in an outer housing 2 (see FIG. 1). For example, a shooting button 3 is disposed on an upper surface of the outer housing 2, a light-emitting portion 4 is provided on a front surface thereof. Moreover, various operation portions (not shown), such as a zoom key, a display panel (not shown), and the like are disposed on a rear surface thereof.

A lens barrel portion 5 is incorporated into the outer housing 2. An imaging lens 6 is disposed at a front end of the lens barrel portion 5, and an image sensing device (not shown) such as a CCD or a CMOS is disposed at a rear end thereof.

Configuration of Optical Apparatus

In the lens barrel portion 5, an optical apparatus 7 is disposed between the imaging lens 6 and the image sensing device. The optical apparatus 7 has a function of adjusting the quantity of light incident to the image sensing device through the imaging lens 6. For example, the optical apparatus 7 is provided as a shutter device that limits the light incident to the image sensing device when the shooting button 3 is pressed.

Figure 2:
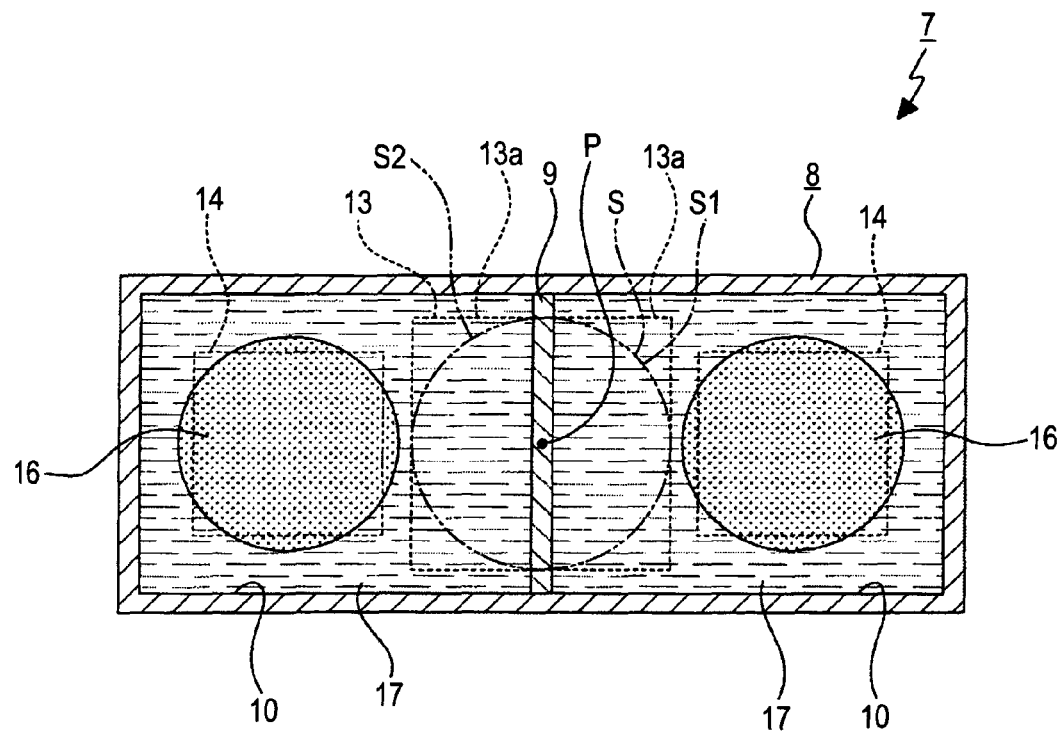
FIG. 2 is a vertical sectional view of an optical apparatus having two chambers, showing a state where a colored polar liquid is at an open position.
Figure 3:
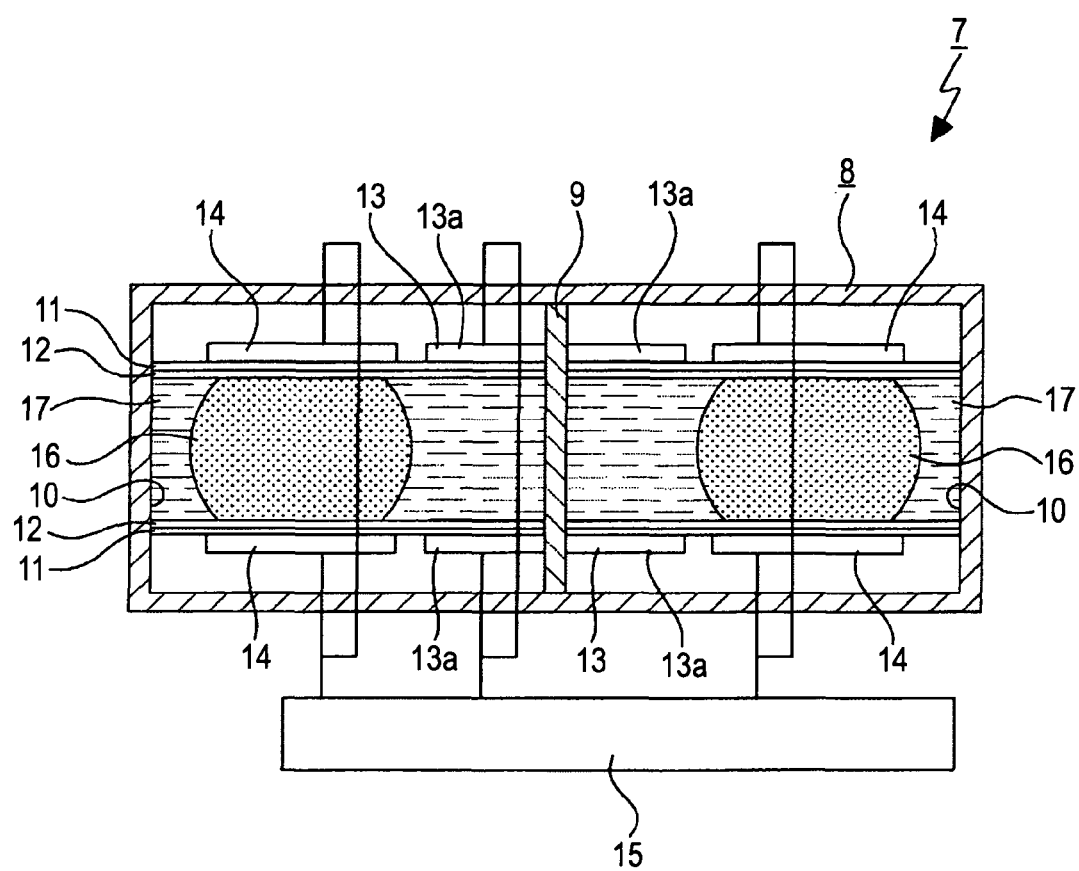
FIG. 3 is a horizontal sectional view of an optical apparatus having two chambers, showing a state where a colored polar liquid is at an open position.

The optical apparatus 7 is provided with a sealing case 8 that is horizontally long and made of a transparent material, for example. A partition wall 9 is provided at a central portion in the horizontal direction of the sealing case 8 (see FIGS. 2 and 3). The partition wall 9 is disposed so that a thickness direction thereof is perpendicular to an optical axis. The partition wall 9 has a thickness of 30 μm or smaller, for example.

The inner space of the sealing case 8 is divided by the partition wall 9, whereby two chambers 10 are formed in the sealing case 8.

An insulating film 11 and a water-repellent film 12 are laminated and disposed in the vicinity of both front and rear inner ends of each of the chambers 10. The water-repellent films 12 are disposed on the inner side than the insulating films 11. The insulating films 11 and the water-repellent films 12 are made of a light-transmitting material.

In the chambers 10, two common electrodes 13 and four second electrodes 14 are disposed on the outer surfaces of the insulating films 11. The common electrodes 13 and the second electrodes 14 are formed as transparent electrodes which are made using a transparent conductive film, for example.

Half portions of the common electrode 13 are disposed on opposite sides over the partition wall 9, whereby the half portions are provided as first electrodes 13a. Each two of the second electrodes 14 are disposed, for example, on the left and right sides of the common electrodes 13.

A voltage application device 15 supplies a driving voltage to the common electrodes 13 and the second electrodes 14. The driving voltage is selectively applied to any one of the common electrodes 13 and the second electrodes 14. That is, when the driving voltage is applied to the common electrodes 13, the driving voltage is not applied to the second electrodes 14. When the driving voltage is applied to the second electrodes 14, the driving voltage is not applied to the common electrodes 13.

In each of the chambers 10, a polar liquid 16 and a nonpolar liquid 17 are sealed between the water-repellent films 12. The polar liquids 16 have a property such that they are pulled towards the common electrodes 13 or the second electrodes 14 by an electrowetting phenomenon, to which the driving voltage is applied, and are colored with a color having a light-blocking property. The nonpolar liquids 17 have a light-transmitting property, and are clear and colorless liquid, for example.

The optical apparatus 7 is configured so that an optical axis P passes through the centers of the front and rear surfaces of the partition wall 9. Moreover, the partition wall 9 is positioned at a position where it passes through the center of an optically effective area S including the optical axis P. Therefore, the optically effective area S includes an area S1 which is positioned on one chamber 10 and an area S2 which is positioned on the other chamber 10.

In the optical apparatus 7 configured in this way, when the shooting button 3 is not operated, the driving voltage is applied to the second electrodes 14 whereas the driving voltage is not applied to the common electrodes 13. Therefore, the polar liquids 16 are pulled towards the second electrodes 14 and maintained at open positions where the optically effective area S is opened (see FIGS. 2 and 3).

In this case, since the nonpolar liquids 17 having a light-transmitting property are present in the optically effective area S, light is allowed to be incident to the image sensing device through the imaging lens 6.

Figure 4:
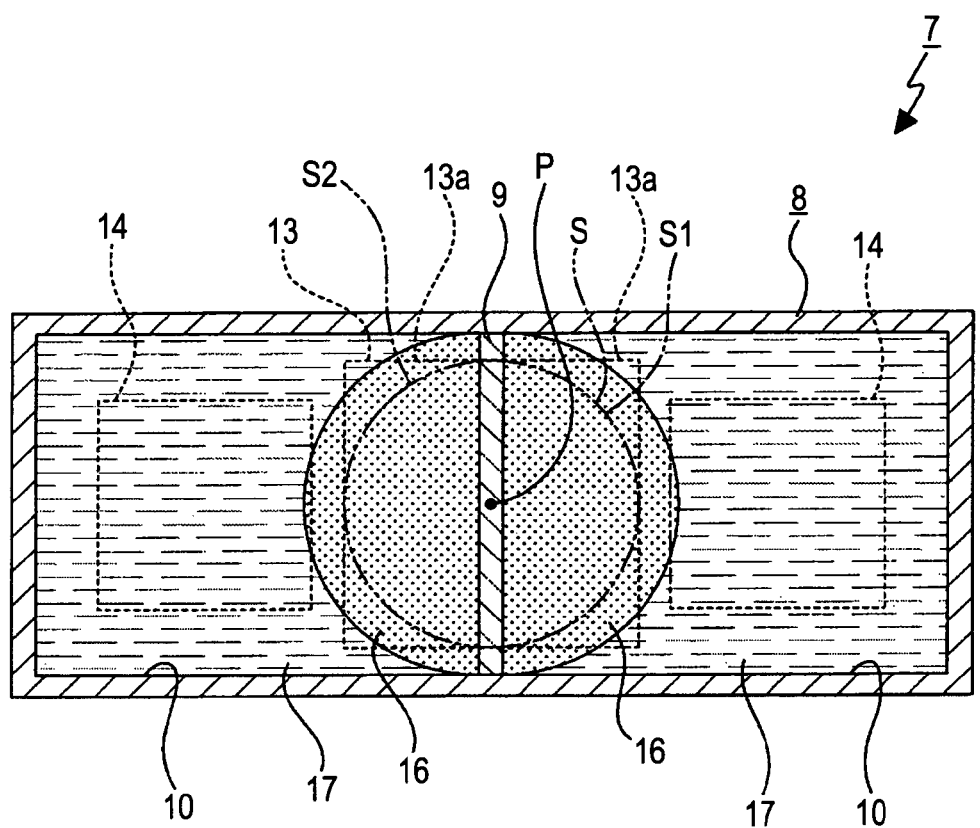
FIG. 4 is a vertical sectional view of an optical apparatus having two chambers, showing a state where a colored polar liquid is at a closed position.
Figure 5:
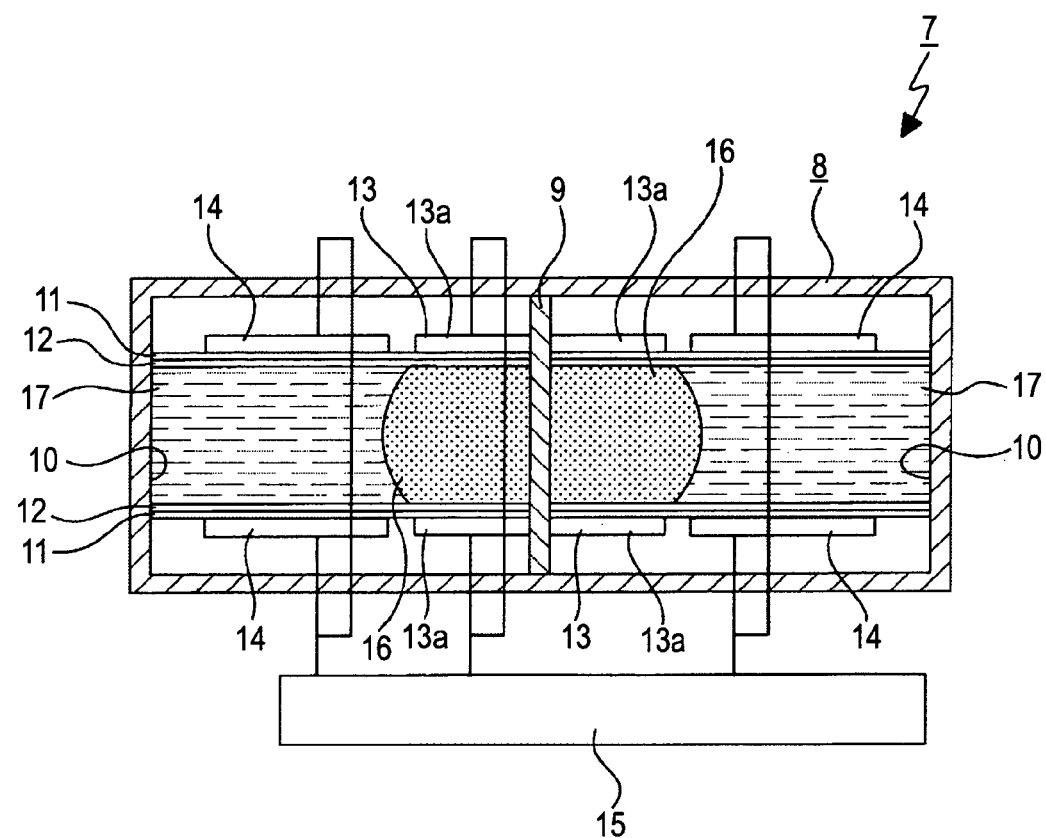
FIG. 5 is a horizontal sectional view of an optical apparatus having two chambers, showing a state where a colored polar liquid is at a closed position.

When the shooting button 3 is pressed, the application of the driving voltage to the second electrodes 14 is stopped, and the driving voltage is applied to the common electrodes 13. Therefore, the polar liquids 16 are pulled towards the common electrodes 13 and moved to closed positions where the areas S1 and S2 are closed (see FIGS. 4 and 5). When the polar liquids 16 are moved to the closed positions, the incidence of light to the image sensing device is blocked.

The application of the driving voltage to the common electrodes 13 is stopped instantly. Simultaneously with the stopping of the application of the driving voltage to the common electrodes 13, the driving voltage is applied again to the second electrodes 14. Therefore, the polar liquids 16 are pulled again towards the second electrodes 14 and moved and maintained at the open positions where the areas S1 and S2 are opened (see FIGS. 2 and 3).

Another Configuration of Optical Apparatus

Figure 6:
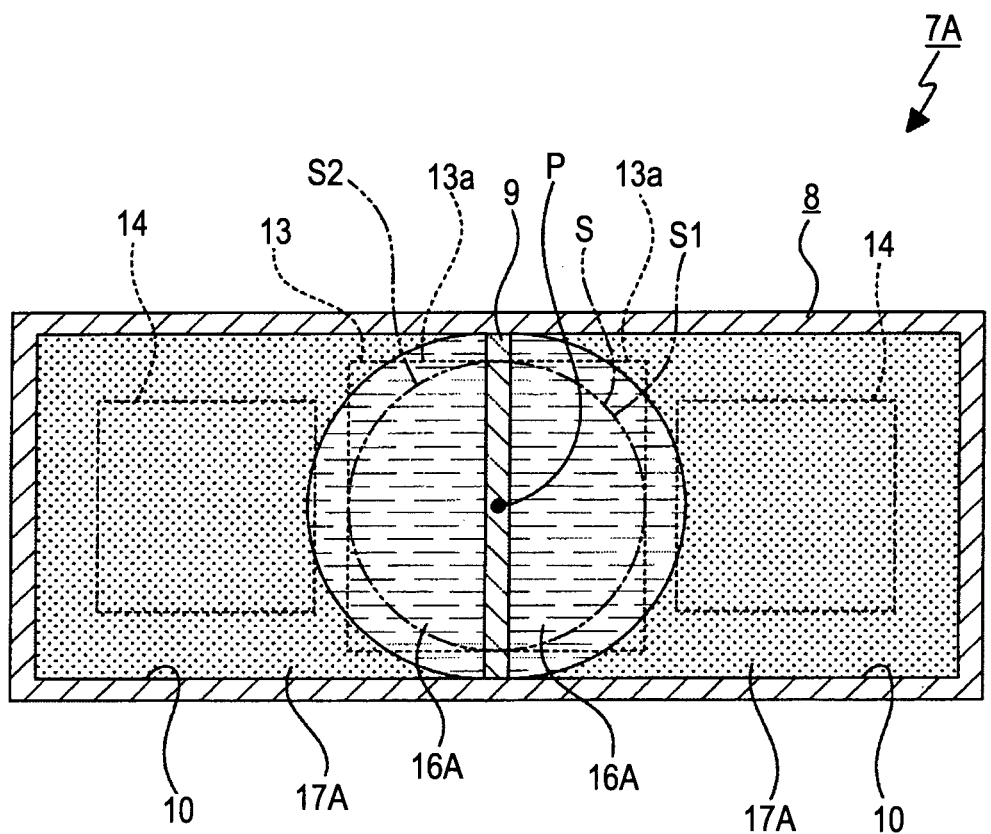
FIG. 6 is a vertical sectional view of an optical apparatus having two chambers, showing a state where a non-colored polar liquid is at a closed position.
Figure 7:
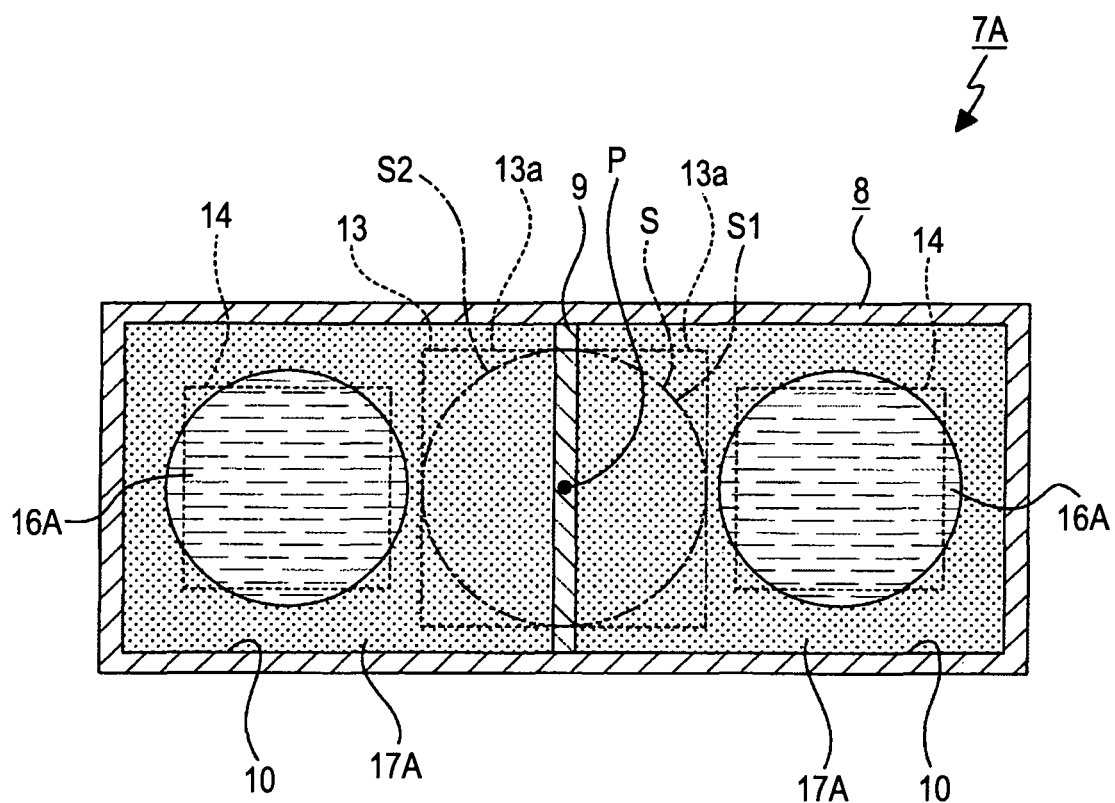
FIG. 7 is a vertical sectional view of an optical apparatus having two chambers, showing a state where a non-colored polar liquid is at an open position.

In the above example, the polar liquids 16 are colored with a color having a light-blocking property, and the optically effective area S is closed by the polar liquids 16 when the driving voltage is applied to the common electrodes 13. However, like an optical apparatus 1A described below, the nonpolar liquids may be colored with a color having a light-blocking property, the polar liquids may have a light-transmitting property, and the optically effective area S may be closed by the nonpolar liquids (see FIGS. 6 and 7).

The optical apparatus 7A includes two chambers 10. In each of the chambers 10, a polar liquid 16A and a nonpolar liquid 17A are sealed between the water-repellent films 12. The polar liquids 16A have a property such that they are pulled towards the common electrodes 13 or the second electrodes 14 by an electrowetting phenomenon, to which the driving voltage is applied, and have a light-transmitting property and are clear and colorless liquids, for example. The nonpolar liquids 17A are colored with a color having a light-blocking property.

In the optical apparatus 7A, when the shooting button 3 is not operated, the driving voltage is applied to the common electrodes 13 whereas the driving voltage is not applied to the second electrodes 14. Therefore, the polar liquids 16A are pulled towards the common electrodes 13 and maintained at the closed positions where the areas S1 and S2 of the optically effective area S are closed (see FIG. 6).

In this case, since the polar liquids 16A having a light-transmitting property are present in the optically effective area S, light is allowed to be incident to the image sensing device through the imaging lens 6.

When the shooting button 3 is pressed, the application of the driving voltage to the common electrodes 13 is stopped, and the driving voltage is applied to the second electrodes 14. Therefore, the polar liquids 16A are pulled towards the second electrodes 14 and moved to the open positions where the areas S1 and S2 are opened (see FIG. 7). When the polar liquids 16A are moved to the open positions, the nonpolar liquids 17A having a light-blocking property are present in the areas S1 and S2. Thus, the incidence of light to the image sensing device is blocked.

The application of the driving voltage to the second electrodes 14 is stopped instantly. Simultaneously with the stopping of the application of the driving voltage to the second electrodes 14, the driving voltage is applied again to the common electrodes 13. Therefore, the polar liquids 16A are pulled again towards the common electrodes 13 and moved and maintained at the closed positions where the areas S1 and S2 are closed (see FIG. 6).

Configuration of Optical apparatus Having Four Chambers

Figure 8:
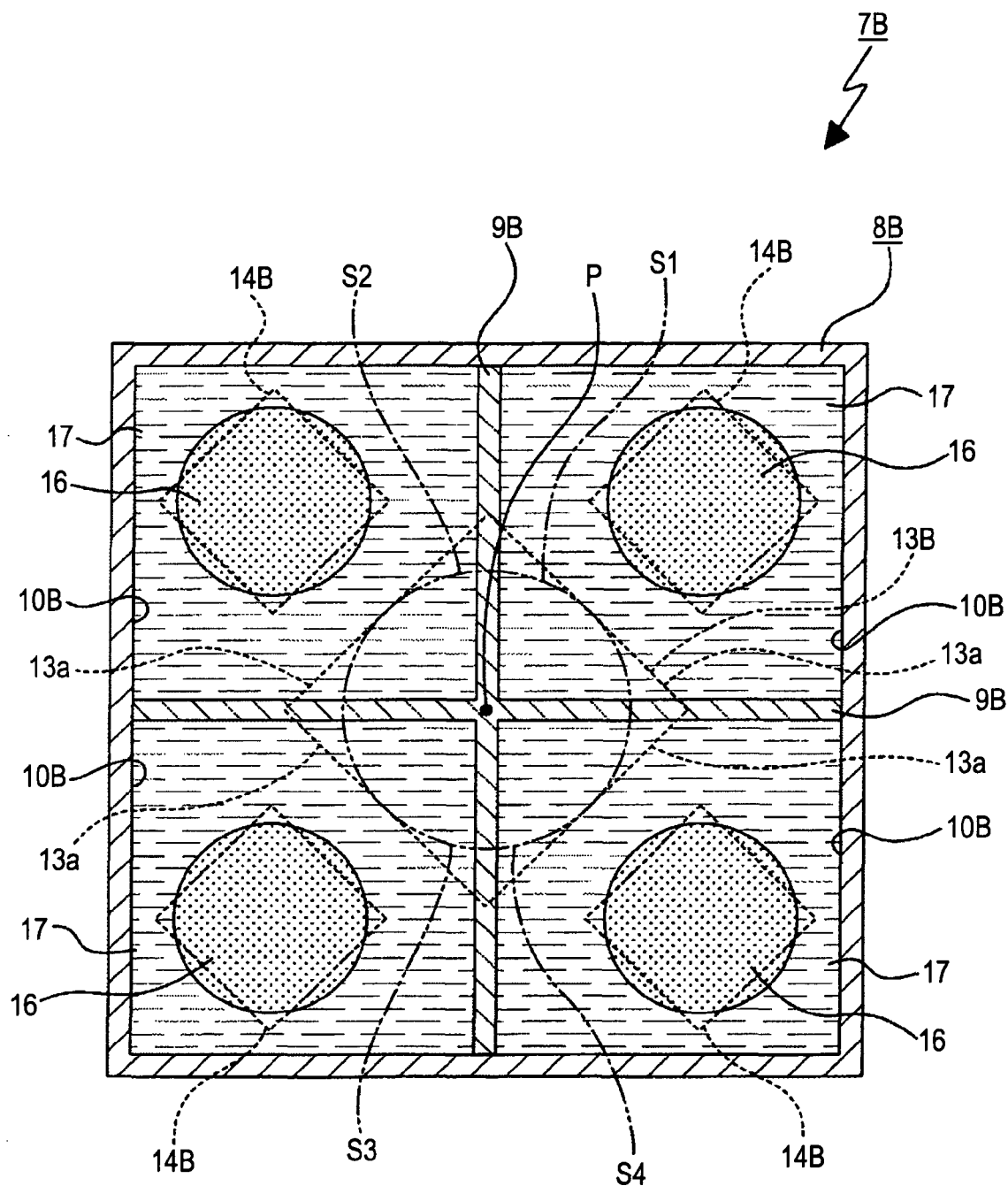
FIG. 8 is a vertical sectional view of an optical apparatus having four chambers, showing a state where a colored polar liquid is at an open position.
Figure 9:
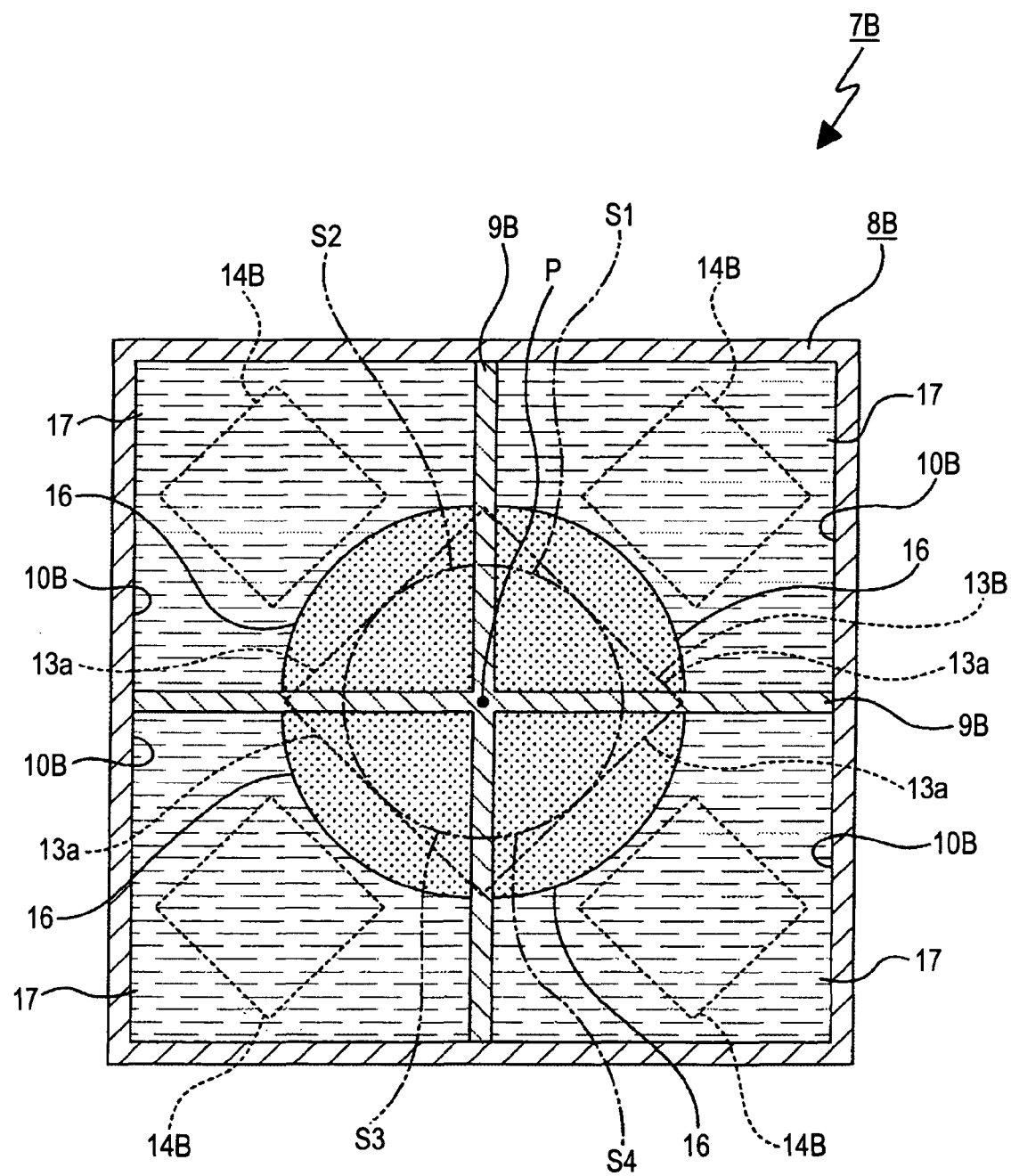
FIG. 9 is a vertical sectional view of an optical apparatus having four chambers, showing a state where a colored polar liquid is at a closed position.

In the above examples, the optical apparatuses 7 and 7A having two chambers 10 have been described. The number of chambers 10 may be any plural number. For example, like an optical apparatus 7B described below, the optical apparatus may have four chambers 10 (see FIGS. 8 and 9).

The optical apparatus 7B is provided with a sealing case 8B that is made of a transparent material, for example. Partition walls 9B are provided at a central portion in the horizontal direction of the sealing case 8B and a central portion in the vertical direction thereof, respectively.

The inner space of the sealing case 8B is divided by the partition walls 9B, whereby four chambers 10B are formed in the sealing case 8B.

In the optical apparatus 7B, common electrodes 13B are disposed at the central portion thereof. Moreover, a pair of second electrodes 14B is disposed in each of the chambers 10B.

One-fourth portions of the common electrode 13B are disposed in each of the chambers 10B, whereby the one-fourth portions are provided as first electrodes 13a.

A polar liquid 16 and a nonpolar liquid 17 are sealed in each of the chambers 10B.

The optical apparatus 7B is configured so that the optical axis P passes through the intersection of the partition walls 9B. Moreover, the partition walls 9B are positioned in the optically effective area S including the optical axis P. Therefore, the optically effective area S is formed by areas S1, S2, S3, and S4 which are present in the respective chambers 10B.

In the optical apparatus 7B configured in this way, when the shooting button 3 is not operated, the driving voltage is applied to the second electrodes 14B whereas the driving voltage is not applied to the common electrodes 13B. Therefore, the polar liquids 16 are pulled towards the second electrodes 14B and maintained at open positions where the optically effective area S is opened (see FIG. 8).

In this case, since the nonpolar liquids 17 having a light-transmitting property are present in the optically effective area S, light is allowed to be incident to the image sensing device through the imaging lens 6.

When the shooting button 3 is pressed, the application of the driving voltage to the second electrodes 14B is stopped, and the driving voltage is applied to the common electrodes 13B. Therefore, the polar liquids 16 are pulled towards the common electrodes 13B and moved to closed positions where the areas S1, S2, S3, and S4 are closed (see FIG. 9). When the polar liquids 16 are moved to the closed positions, the incidence of light to the image sensing device is blocked.

The application of the driving voltage to the common electrodes 13B is stopped instantly. Simultaneously with the stopping of the application of the driving voltage to the common electrodes 13B, the driving voltage is applied again to the second electrodes 14B. Therefore, the polar liquids 16 are pulled again towards the second electrodes 14B and moved and maintained at the open positions where the areas S1, S2, S3, and S4 are opened (see FIG. 8).

In the optical apparatus 1B, similarly to the optical apparatus 1A, the polar liquids 16 may have a light-transmitting property, and the nonpolar liquids 17 may be colored with a color having a light-blocking property. By doing so, light is allowed to be incident to the image sensing device in a state where the polar liquids 16 are at the closed positions, whereas the incidence of light to the image sensing device is blocked in a state where the polar liquids 16 are at the open positions.

In addition, in the above examples, the optical apparatuses 7, 7A, and 7B having two or four chambers 10 and 10B have been described. The number of chambers 10 and 10B may be any plural number. When the optically effective area S having the same size is opened and closed, by increasing the number of chambers 10 and 10B, it is possible to decrease the amount of the polar liquids 16 and 16A sealed in the respective chambers 10 and 10B.

As described above, since the optical apparatuses 7, 7A, and 7B are formed with a plurality of chambers 10 and 10B, and a predetermined amount of polar liquid 16 is sealed in each of the chambers 10 and 10B, the respective polar liquids 16 in the respective chambers 10 and 10B are allowed to move.

Therefore, reliability of the movement of the polar liquid 16 can be improved. Moreover, the volume (weight) of the respective polar liquids 16 sealed in the respective chambers 10 and 10B decreases, and thus, the movement of the polar liquid 16 can be accelerated.

In addition, since the weight of the respective polar liquids 16 sealed in the respective chambers 10 and 10B decreases, it is possible to accelerate the movement with less power.

Furthermore, since the optical apparatuses 7, 7A, and 7B are provided with the common electrodes 13 and 13B, it is possible to decrease the number of electrodes and wirings, simplify a mechanism, and achieve a reduction in the manufacturing costs.

Another Application Example of Optical Apparatus

In the above examples, the optical apparatuses 7, 7A, and 7B are used as a shutter device. However, the applicability of the optical apparatuses 7, 7A, and 7B is not limited to the shutter device but can be applied to any device if it is capable of adjusting a quantity of light. For example, the optical apparatus can be used as an ND (Neutral Density) filter device and an iris device.

For example, the optical apparatus 7B can be used as an iris device by allowing the respective polar liquids 16 sealed in the four chambers 10B to independently move between the open position and the closed position. In this way, by allowing the polar liquids 16 to independently move between the open position and the closed position, when the quantity of light passing through the optically effective area S is 100% if all polar liquids 16 are at the open position, the quantity of light can be adjusted in five stages of 100%, 75%, 50%, 25%, and 0%.

Manufacturing Method of Optical Apparatus

Figure 10:
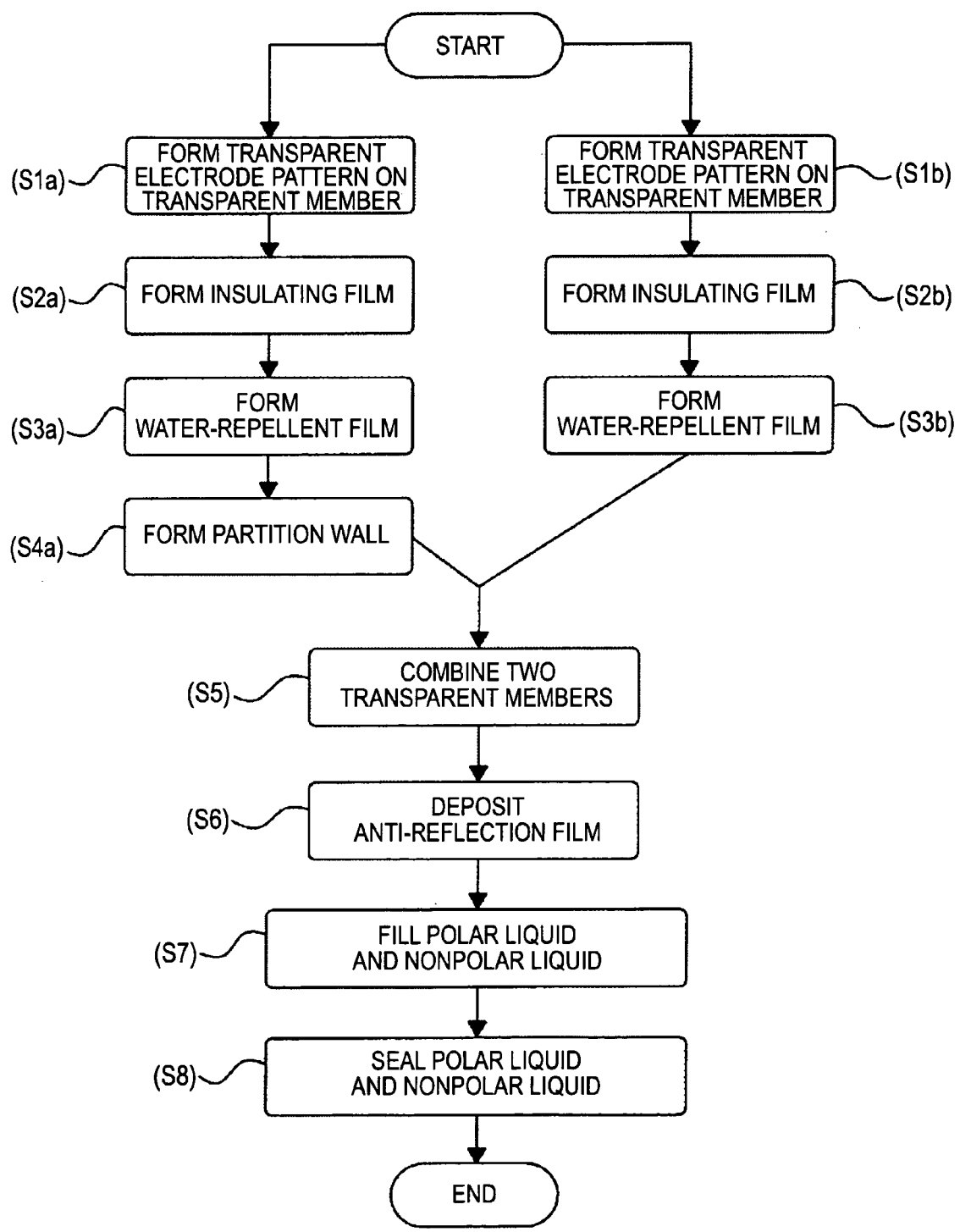
FIG. 10 is a flowchart showing an example of a manufacturing method of an optical apparatus.

Next, an example of a manufacturing method of the optical apparatus 7 will be described (see FIG. 10).

S1a and S1b

Manufacturing of an optical apparatus starts with preparing two transparent members (transparent glass plates). A transparent electrode pattern such as ITO (Indium Tin Oxide) is formed on the respective transparent members. The electrode pattern is formed, for example, by a masking method, an etching method, and the like.

S2a and S2b

A dielectric film (insulating film) made, for example, of polyvinylidene chloride, polyvinylidene fluoride, and the like is formed on the electrode patterns of the respective transparent members.

S3a and S3b

On the insulating films of the respective transparent members, a water-repellent film is formed using a fluorine-based resin, for example, by a spin coating method, a dip coating method, and the like.

S4a

On one transparent member, a partition wall is formed using a resist made, for example, of an epoxy resin by a photolithography technique. In this case, the partition wall is formed to a thickness of 30 µm or smaller so as to optimize the resist conditions.

S5

The transparent member formed with the partition wall is combined with the other transparent member, whereby a sealing case is formed. In this case, inlet openings are formed in the sealing case so as to fill liquid into the respective chambers through the inlet openings.

S6

An anti-reflection film is deposited on a desired surface of the sealing case.

S7

A polar liquid and a nonpolar liquid are filled into the sealing case through the respective inlet openings. Colored pure water, for example, is used as the polar liquid, and oil solution, for example, is used as the nonpolar liquid.

S8

When the filling is completed, the inlet openings are closed so as to hermetically seal the polar liquid and the nonpolar liquid. In this way, manufacturing of the optical apparatus is completed.

Besides the pure water mentioned above, examples of the liquid which can be used as the polar liquid include nitromethane, acetic anhydride, methyl acetate, ethyl acetate, methanol, acetonitrile, acetone, ethanol, propionitrile, tetrohydrofuran, n-hexane, 2-propanol, 2-butanone, n-butyronitrile, 1-propanol, 1-butanol, dimethyl sulfoxide, chlorobenzene, ethylene glycole, formamide, nitrobenzene, propylene carbonate, 1,2-dichloroethane, carbonate disulfide, chloroform, bromobenzene, carbon tetrachloride, trichloroacetic acid anhydride, toluene, benzene, ethylenediamine, N,N-dimethylacetamide, N,N-dimethylformamide, tributyl phosphate, pyridine, benzonitrile, aniline, 1,4-dioxane, hexamethylphosphoramide, and the like.

Besides the oil solution mentioned above, examples of the liquid that can be used as the nonpolar liquid includes silicon solution, decane-based solution, octane-based solution, nonane solution, heptane solution, and the like.

Each of the polar liquid and the nonpolar liquid may be formed from a single liquid and may be formed from a mixture of plural liquids.

Effect on Resolution of Partition Wall

In the optical apparatuses 7, 7A, and 7B described above, since the partition wall 9 (9B) is disposed in the optically effective area S, there is a possibility of causing deterioration in resolution. In the following investigation, the effect on resolution of the presence of the partition wall 9 (9B) in the optically effective area S was examined.

Figure 11:
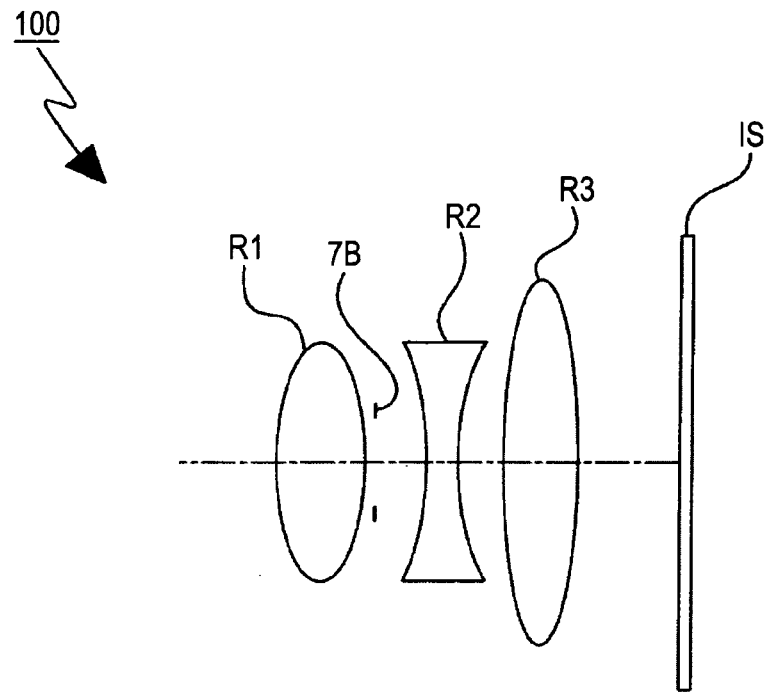
FIG. 11 is a conceptual diagram showing a configuration of a first imaging apparatus used for investigation of an effect on resolution of a partition wall, showing the results of the investigation together with FIGS. 12 to 26.
Figure 12:
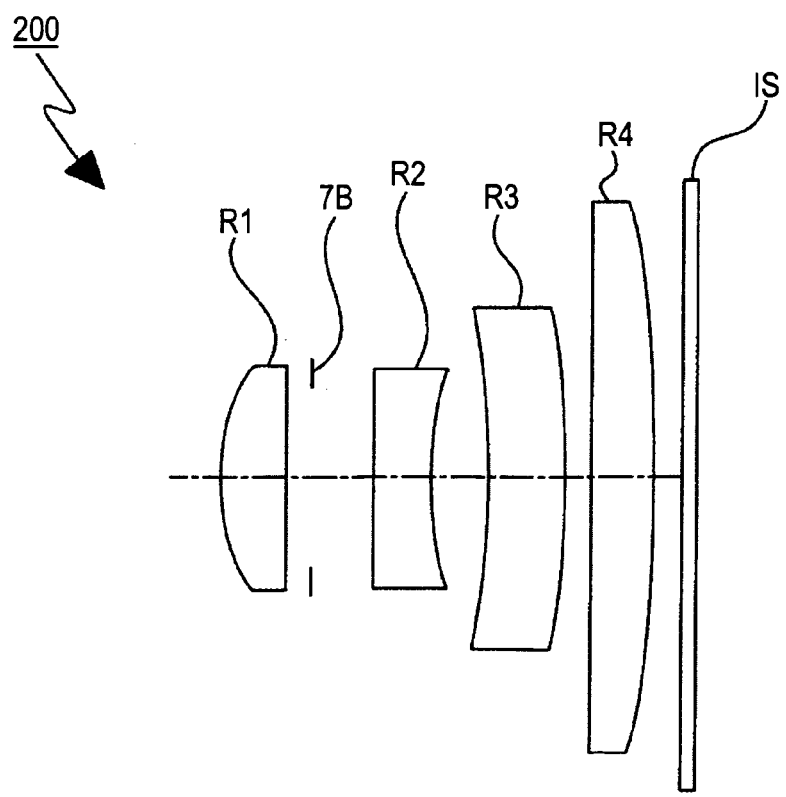
FIG. 12 is a conceptual diagram showing a configuration of a second imaging apparatus used for the investigation.

This investigation was conducted on the optical apparatus 7B having four chambers in which two perpendicular partition walls are present in the optically effective area S. In the investigation, two kinds of imaging apparatuses, namely an imaging apparatus 100 and an imaging apparatus 200 having a different lens configuration were used. As shown in FIG. 11, the imaging apparatus 100 includes three lenses or lens arrays R1, R2, and R3, and an image sensing device IS which is disposed closest to an image side, and the optical apparatus 7B serving as an aperture is disposed between two lenses or lens arrays R1 and R2 which are disposed close to a subject side. In addition, as shown in FIG. 12, the imaging apparatus 200 includes four lenses or lens arrays R1, R2, R3, and R4 and an image sensing device IS which is disposed closest to an image side, and the optical apparatus 7B serving as an aperture is disposed between two lenses or lens arrays R1 and R2 which are disposed close to a subject side.

The imaging apparatus 100 has a lens configuration in which a focal distance f is 3.5 mm, an F number Fno is 3.2, a lens dimension thereof is ¼ of an inch, and a diameter of the aperture (the optical apparatus 7B) is 0.82 mm.

The imaging apparatus 200 has a lens configuration in which a focal distance f is 4.8 mm, an F number Fno is 2.8, a lens dimension thereof is ⅓.2 of an inch, and a diameter of the aperture (the optical apparatus 7B) is 1.43 mm.

Figure 13:
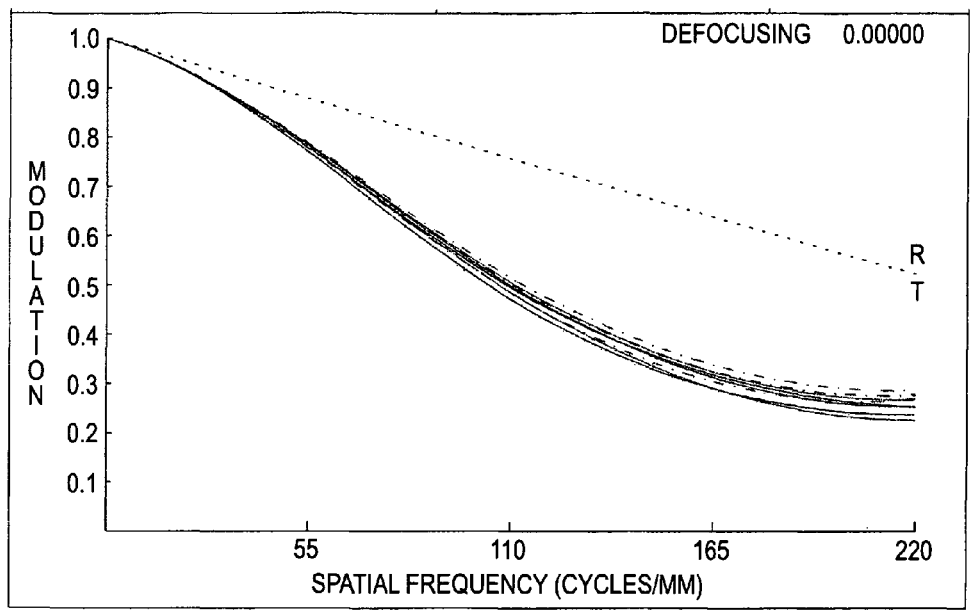
FIG. 13 illustrates graphs showing the standard data of MTF characteristics of the first imaging apparatus without the partition wall, showing the results of investigation of an effect on resolution of the thickness of the partition wall together with FIGS. 14 to 22.
Figure 13:
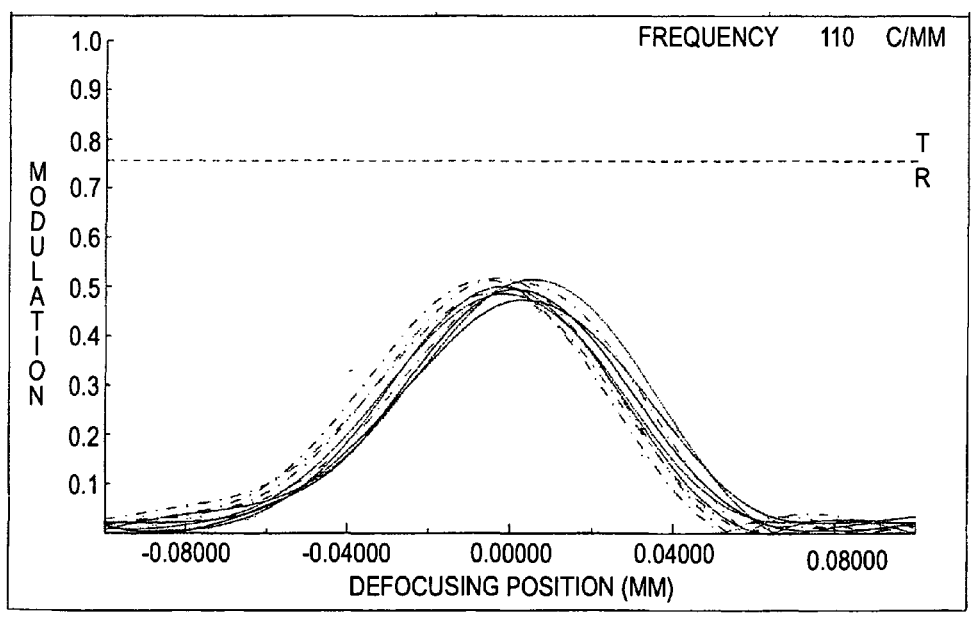

FIGS. 13 to 17 are graphs showing MTF (modulation transfer function) characteristics of the imaging apparatus 100 when the thickness of the partition wall was changed. In the respective figures, the upper graphs show the relationship between an image height and a spatial frequency, and the lower graphs show the relationship between an image height and a defocusing position. Specifically, FIG. 13 illustrates graphs when the thickness of the partition wall is 0 μm, that is when the partition wall is not present, and FIGS. 14, 15, 16, and 17 are graphs when the thickness of the partition wall is 70 μm, 50 μm, 30 μm, and 10 μm, respectively.

The investigation was conducted in the tangential direction (T) and the radial direction (R) at each image height of 0%, 30%, 50%, 60%, and 70% with respect to each thickness of the partition wall.

The graph shown in FIG. 13 corresponds to the case when the partition wall is not present, showing the standard data for verifying the effect on resolution when the thickness of the partition wall was changed.

Figure 14:
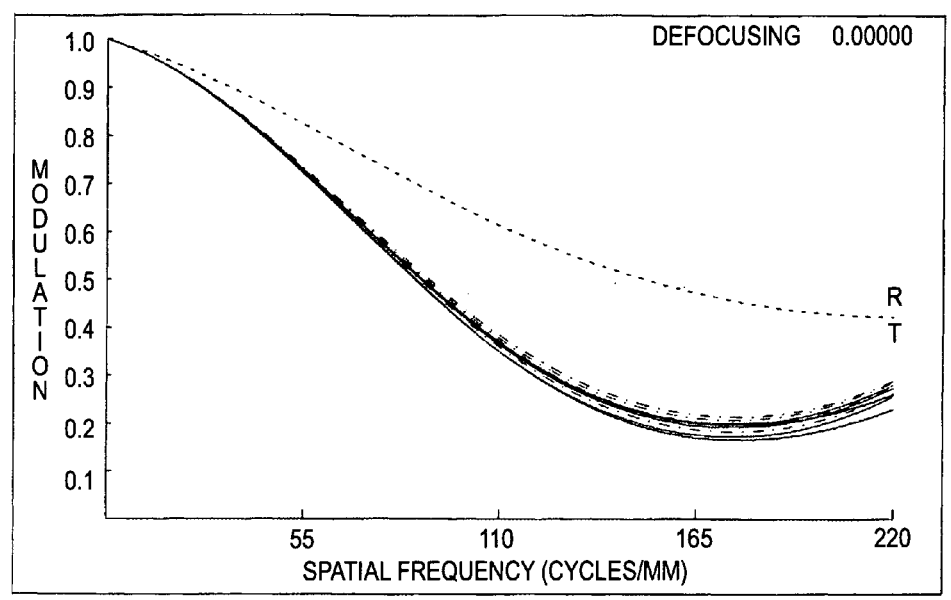
FIG. 14 illustrates graphs showing the MTF characteristics of the first imaging apparatus when the partition wall has a thickness of 70 μm.
Figure 14:
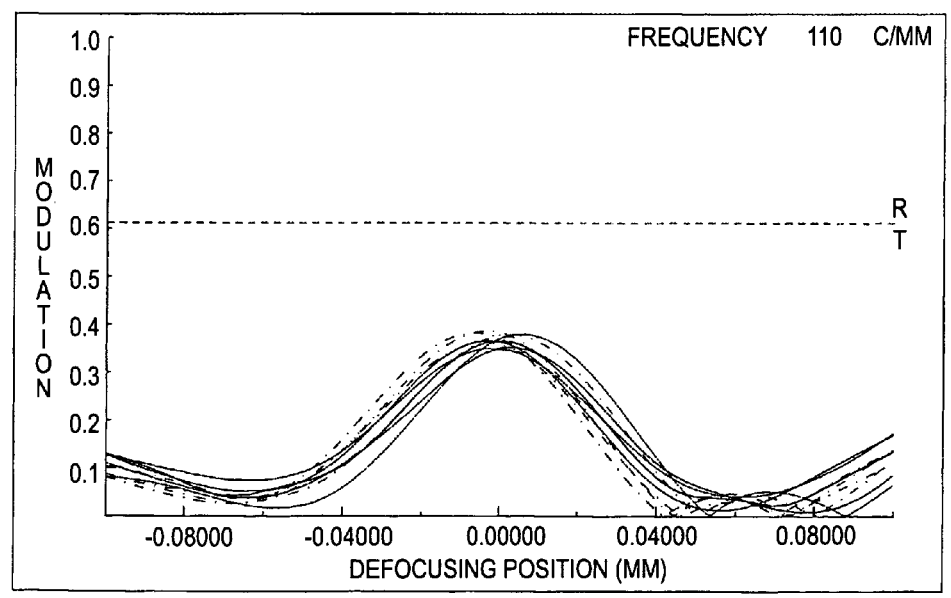
Figure 15:
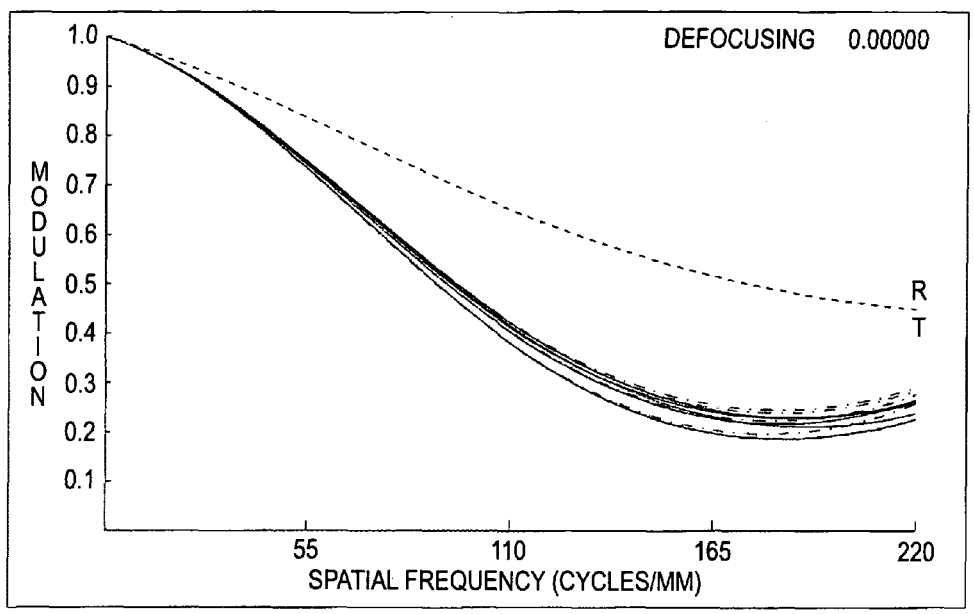
FIG. 15 illustrates graphs showing the MTF characteristics of the first imaging apparatus when the partition wall has a thickness of 50 μm.
Figure 15:
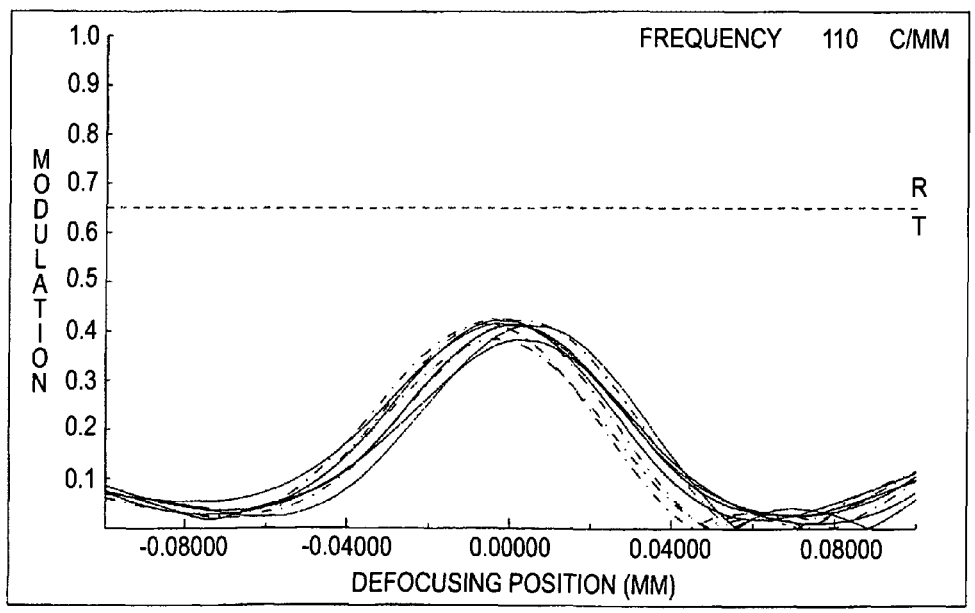
Figure 16:
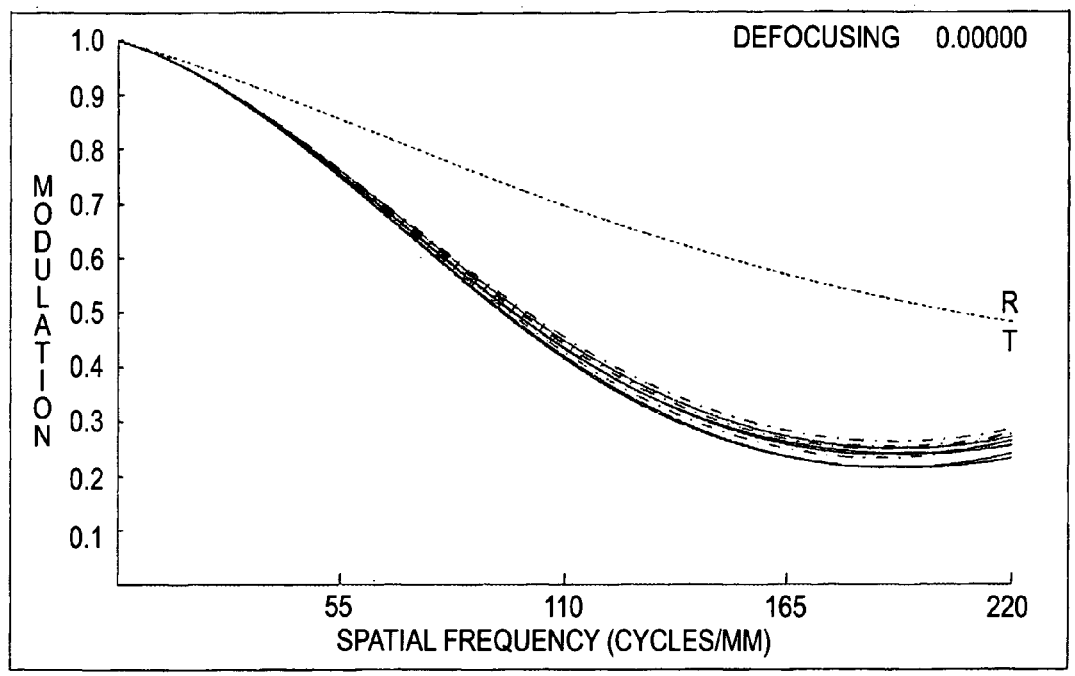
FIG. 16 illustrates graphs showing the MTF characteristics of the first imaging apparatus when the partition wall has a thickness of 30 μm.
Figure 16:
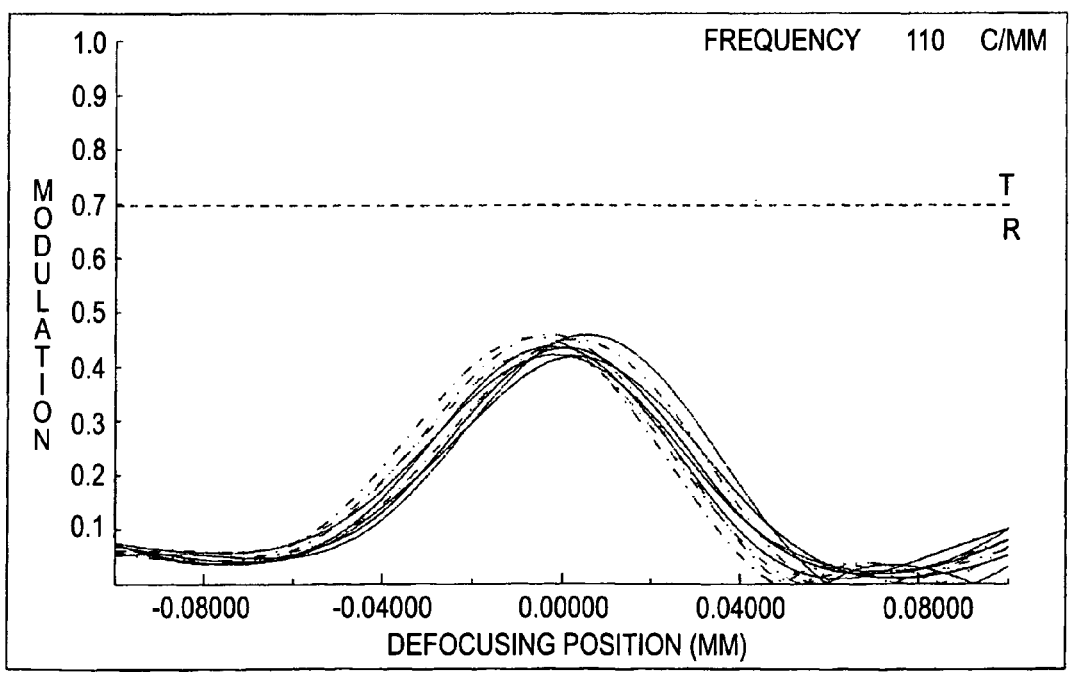
Figure 17:
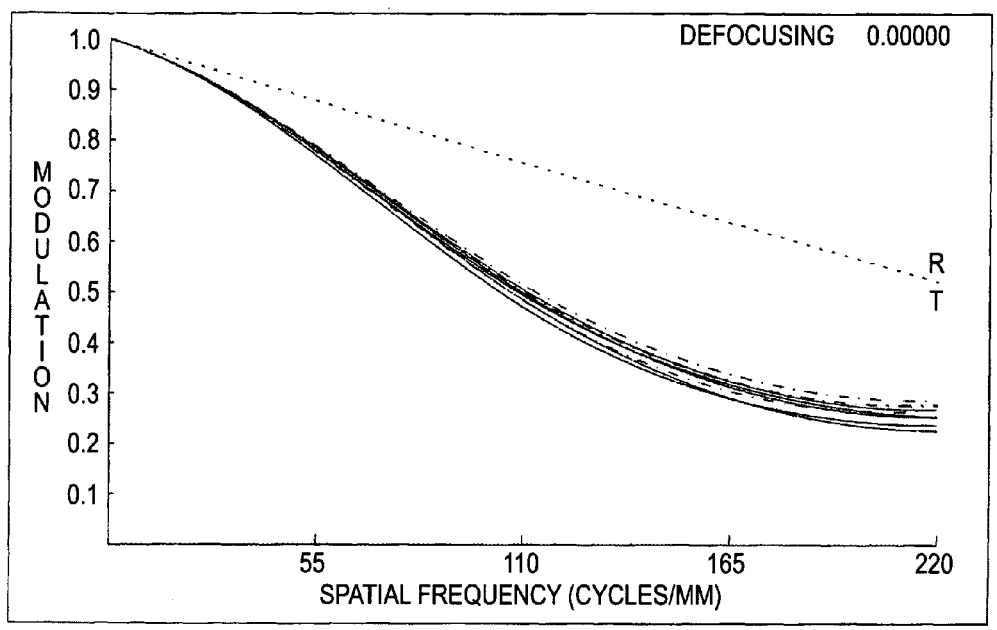
FIG. 17 illustrates graphs showing the MTF characteristics of the first imaging apparatus when the partition wall has a thickness of 10 μm.
Figure 17:
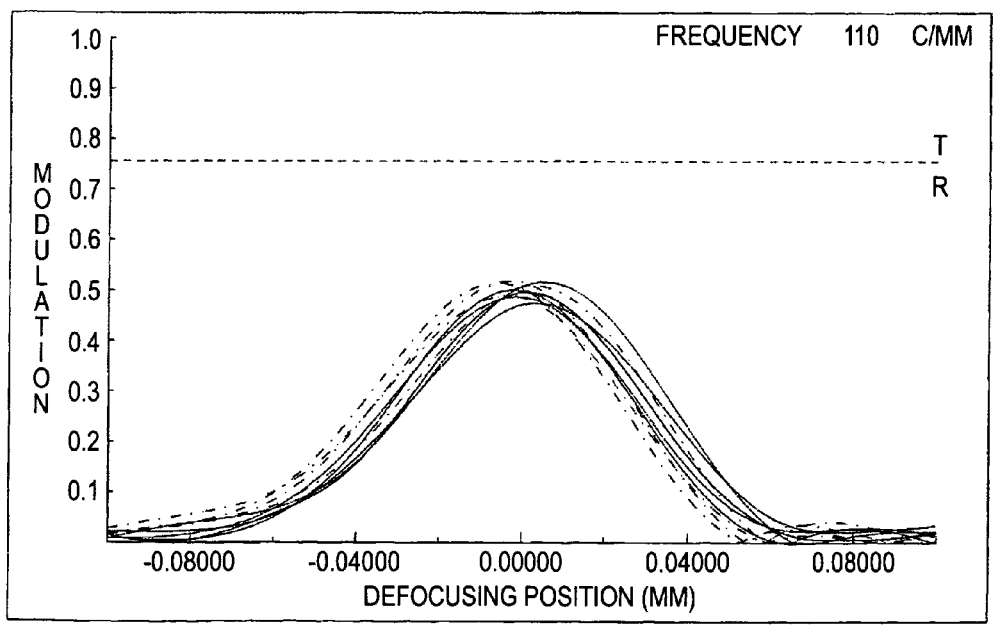

As shown in FIGS. 14 and 15, when the thickness of the partition wall was 70 μm and 50 μm, the MTF values decreased greatly compared to the standard data shown in FIG. 13. However, as shown in FIGS. 16 and 17, when the thickness of the partition wall was 30 μm and 10 μm, the MTF values showed little decrease compared to the standard data shown in FIG. 13.

Figure 18:
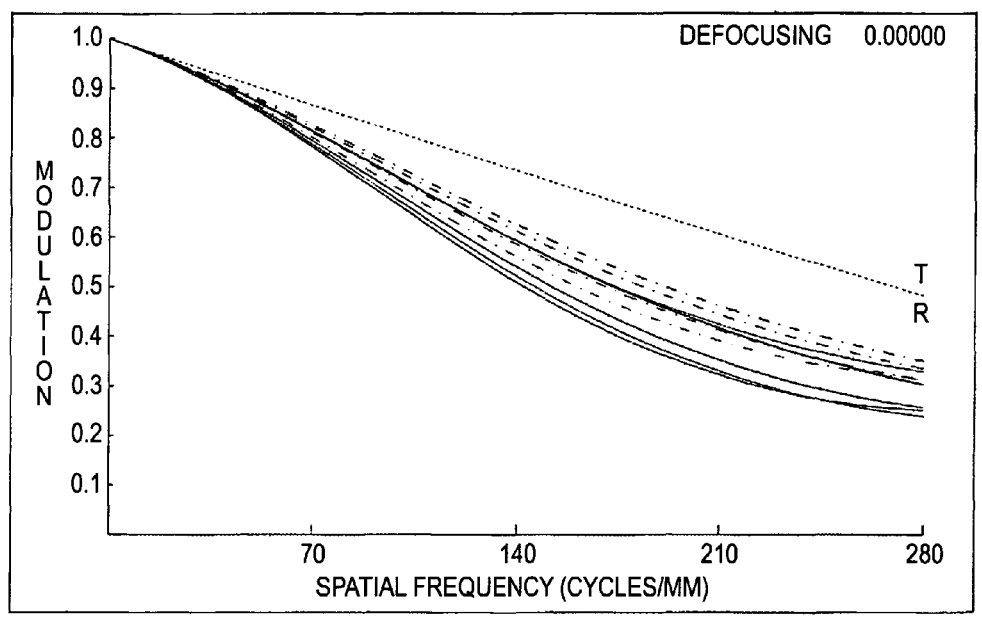
FIG. 18 illustrates graphs showing the standard data of MTF characteristics of the second imaging apparatus without the partition wall.
Figure 18:
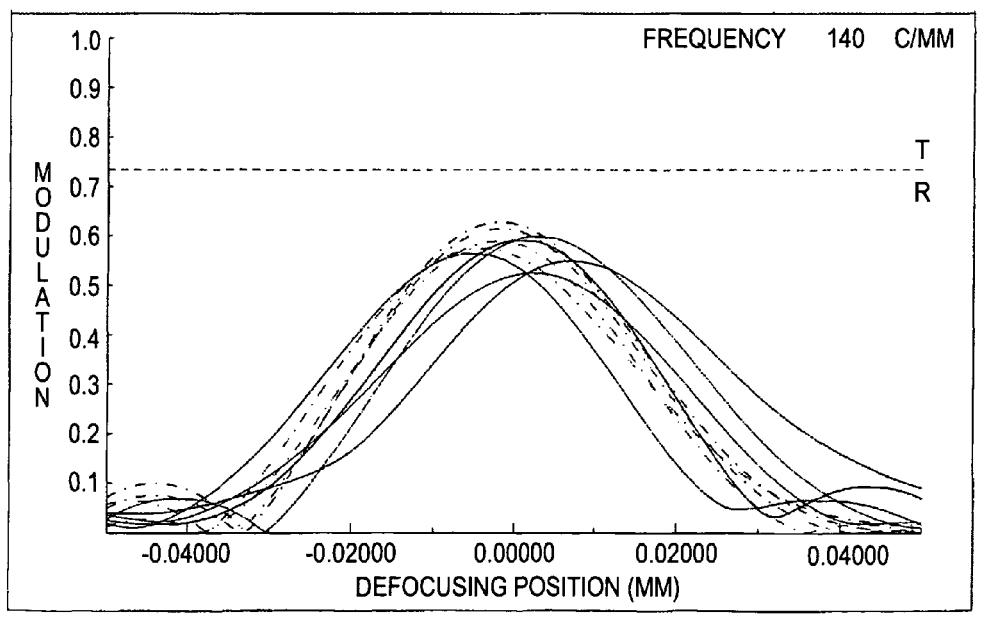

FIGS. 18 to 22 are graphs showing the investigation data of MTF characteristics of the imaging apparatus 200 when the thickness of the partition wall was changed. In the respective figures, the upper graphs show the relationship between an image height and a spatial frequency, and the lower graphs show the relationship between an image height and a defocusing position. Specifically, FIG. 18 illustrates graphs when the thickness of the partition wall is 0 μm, that is when the partition wall is not present, and FIGS. 19, 20, 21, and 22 are graphs when the thickness of the partition wall is 70 μm, 50 μm, 30 μm, and 10 μm, respectively.

The investigation was conducted in the tangential direction (T) and the radial direction (R) at each image height of 0%, 30%, 50%, 60%, and 70% with respect to each thickness of the partition wall.

The graph shown in FIG. 18 corresponds to the case when the partition wall is not present, showing the standard data for verifying the effect on resolution when the thickness of the partition wall was changed.

Figure 19:
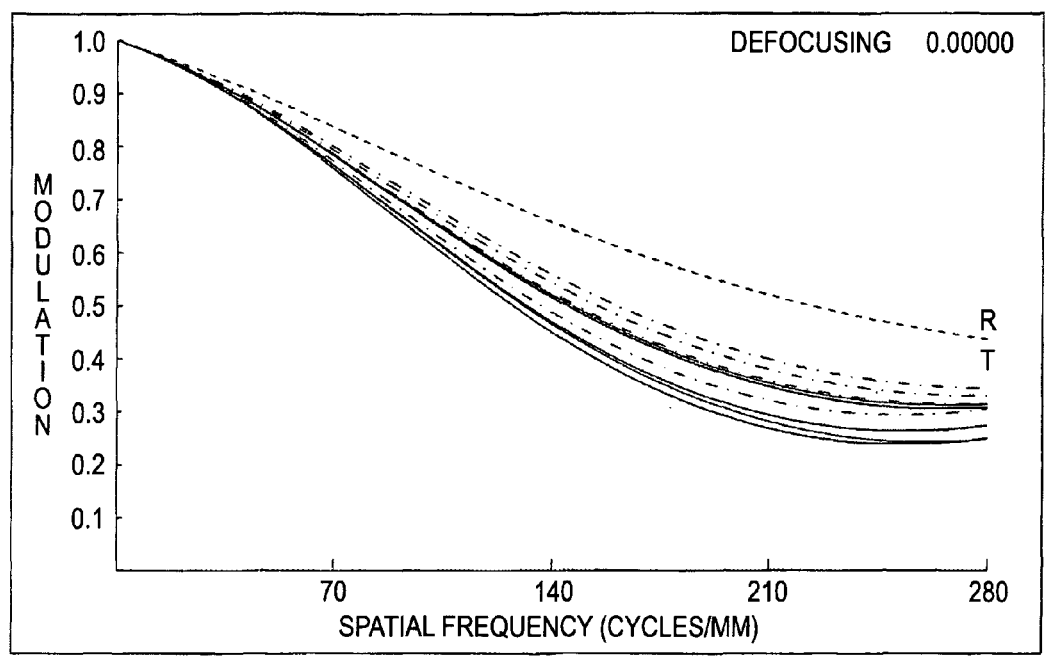
FIG. 19 illustrates graphs showing the MTF characteristics of the second imaging apparatus when the partition wall has a thickness of 70 μm.
Figure 19:
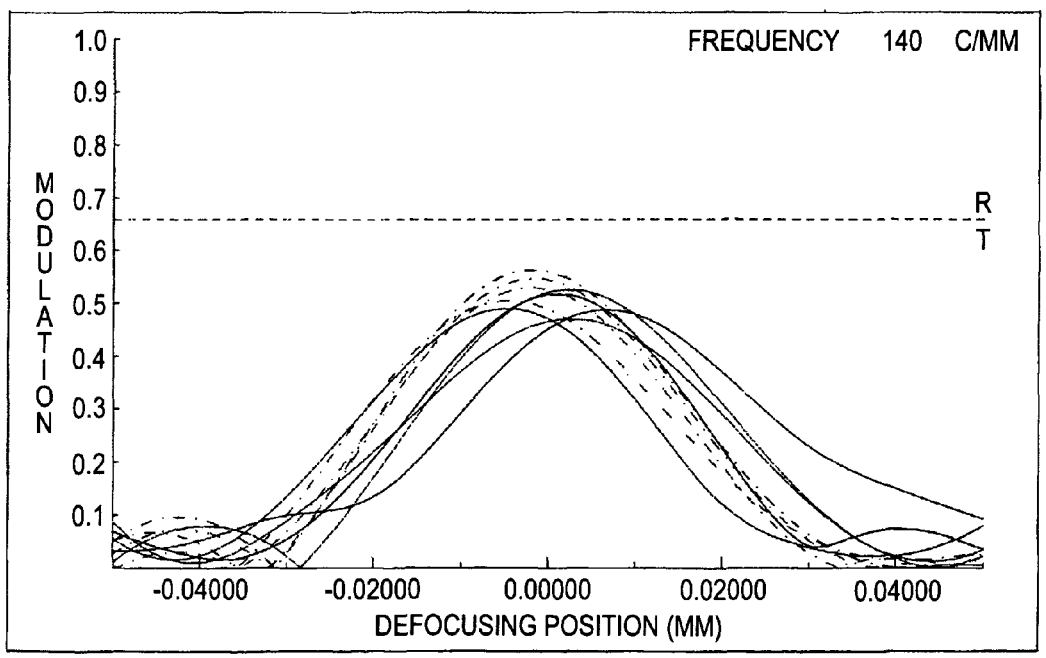
Figure 20:
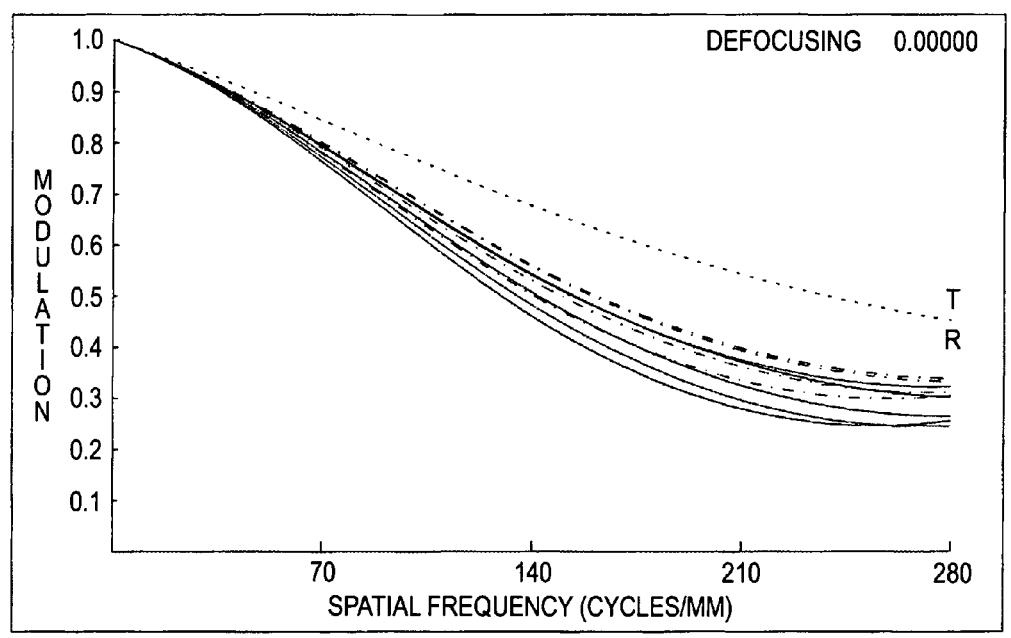
FIG. 20 illustrates graphs showing the MTF characteristics of the second imaging apparatus when the partition wall has a thickness of 50 μm.
Figure 20:
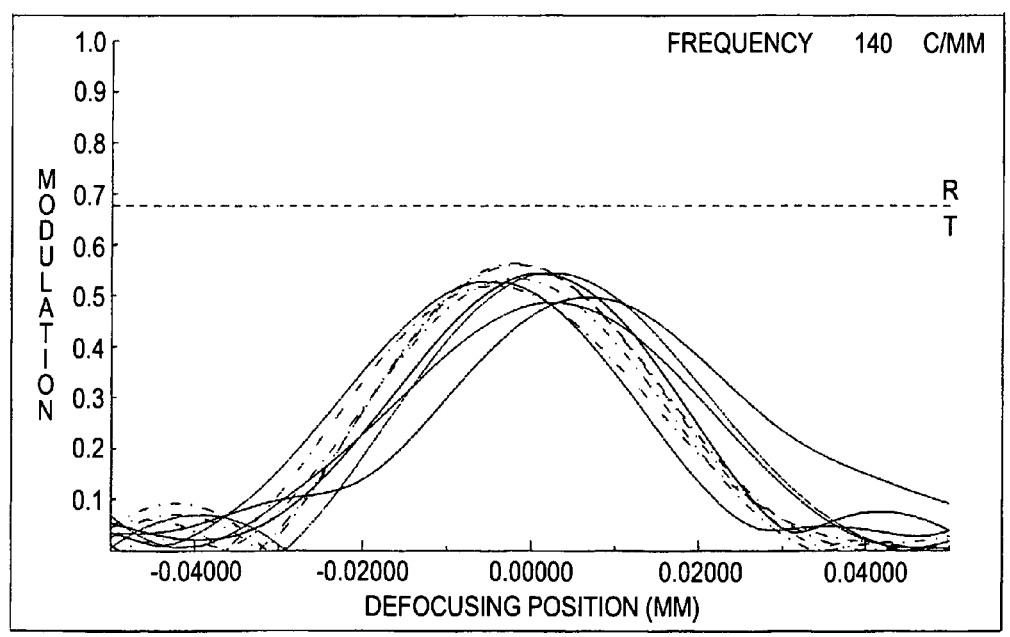
Figure 21:
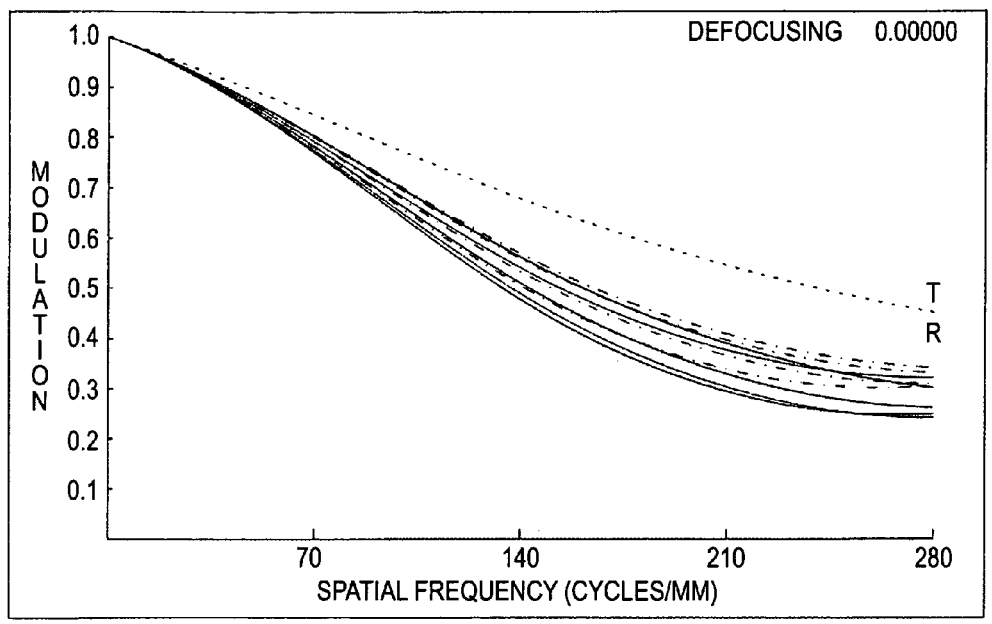
FIG. 21 illustrates graphs showing the MTF characteristics of the second imaging apparatus when the partition wall has a thickness of 30 μm.
Figure 21:
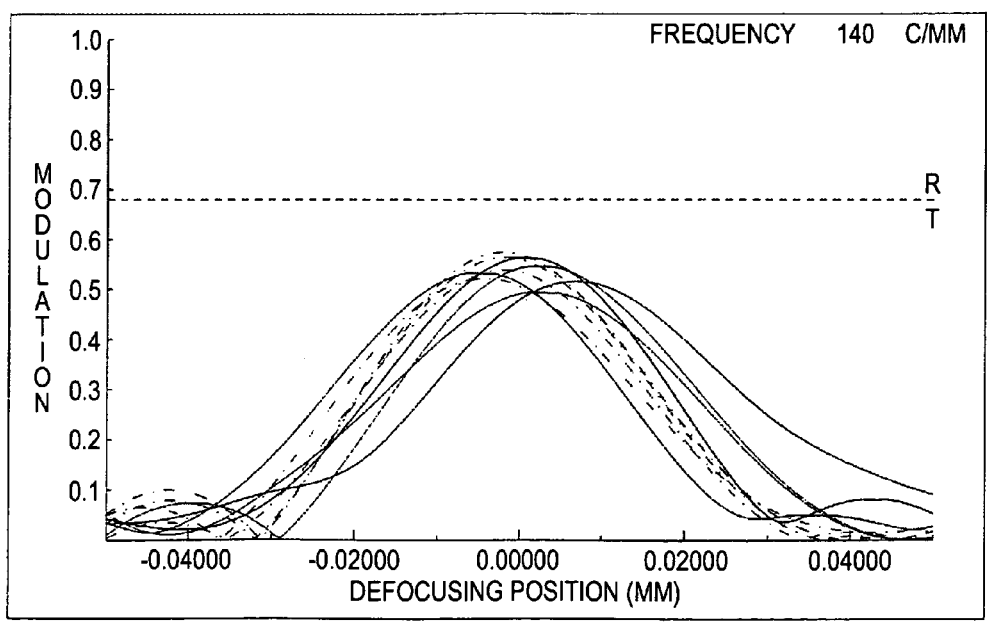
Figure 22:
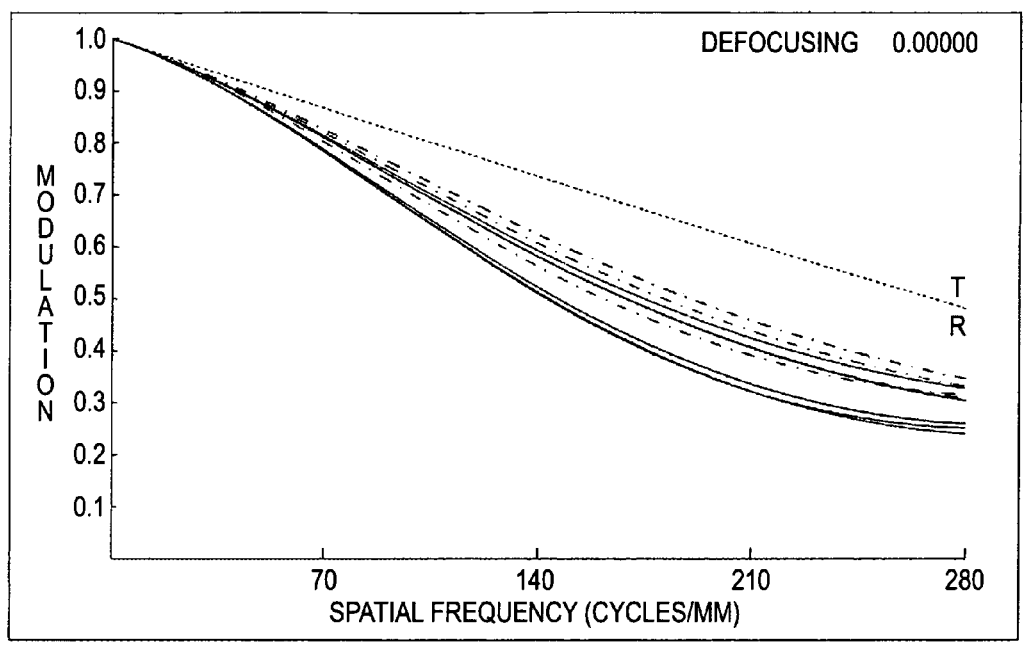
FIG. 22 illustrates graphs showing the MTF characteristics of the second imaging apparatus when the partition wall has a thickness of 10 μm.
Figure 22:
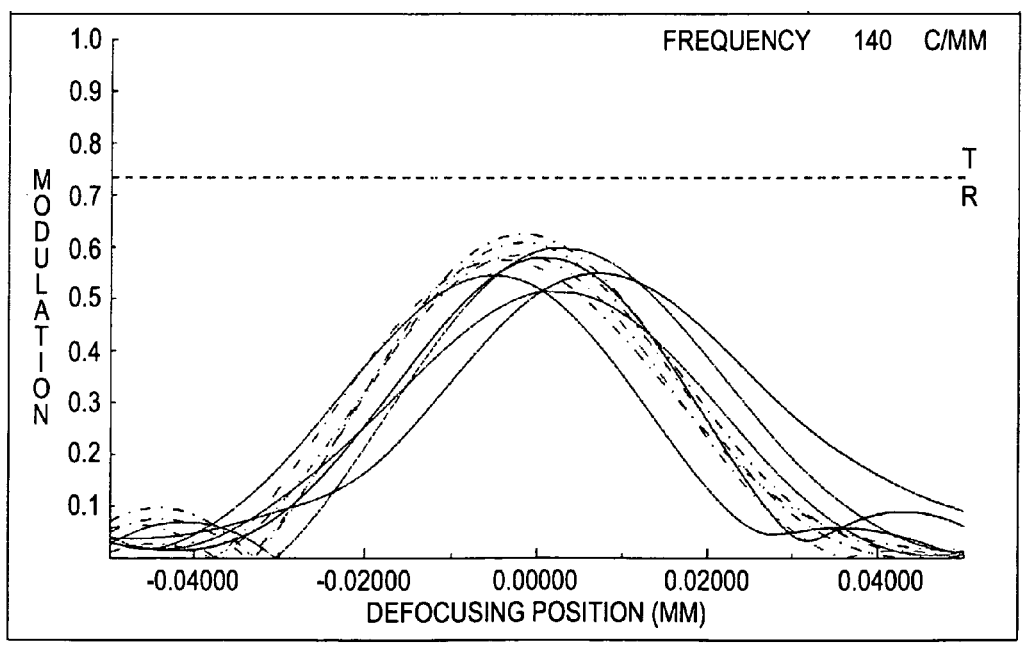

As shown in FIGS. 19 and 20, when the thickness of the partition wall was 70 μm and 50 μm, the MTF values decreased greatly compared to the standard data shown in FIG. 18. However, as shown in FIGS. 21 and 22, when the thickness of the partition wall was 30 μm and 10 μm, the MTF values showed little decrease compared to the standard data shown in FIG. 18.

As described above, in the imaging apparatuses 100 and 200, it was confirmed that the MTF values showed little change compared to the standard data when the thickness of the partition wall was 30 μm and 10 μm, and the effect on resolution of the presence of the partition wall in the optically effective area S was very small when the thickness of the partition wall was 30 μm or smaller.

Therefore, in the optical apparatuses 7, 7A, and 7B, by setting the thickness of the partition wall 9, 9B to be 30 μm or smaller, it is possible to obtain a good image or video in which the partition wall has little effect on resolution.

In the optical apparatuses 7, 7A, and 7B described above, since the partition wall 9 (9B) is disposed in the optically effective area S, there is a possibility of causing deterioration in resolution according to the position of the partition wall 9 (9B) relative to the optically effective area S. In the following investigation, the effect on resolution of the position of the partition wall 9 (9B) in the optically effective area S was examined.

This investigation was conducted on the optical apparatus 7B having four chambers in which two perpendicular partition walls are present in the optically effective area S. In the investigation, the imaging apparatus 100 described above was used. The partition wall used had a thickness of 70 μm.

FIG. 22 illustrates the concept of this investigation and shows a state where the center Q of the intersection of two partition walls is eccentric to the center P of the optically effective area S, namely the point through which the optical axis passes. In this investigation, the MTF characteristics were investigated when the center Q was eccentric to the center P by a distance of 30 μm, 60 μm, and 90 μm in both X (horizontal) and Y (vertical) directions.

Figure 23:
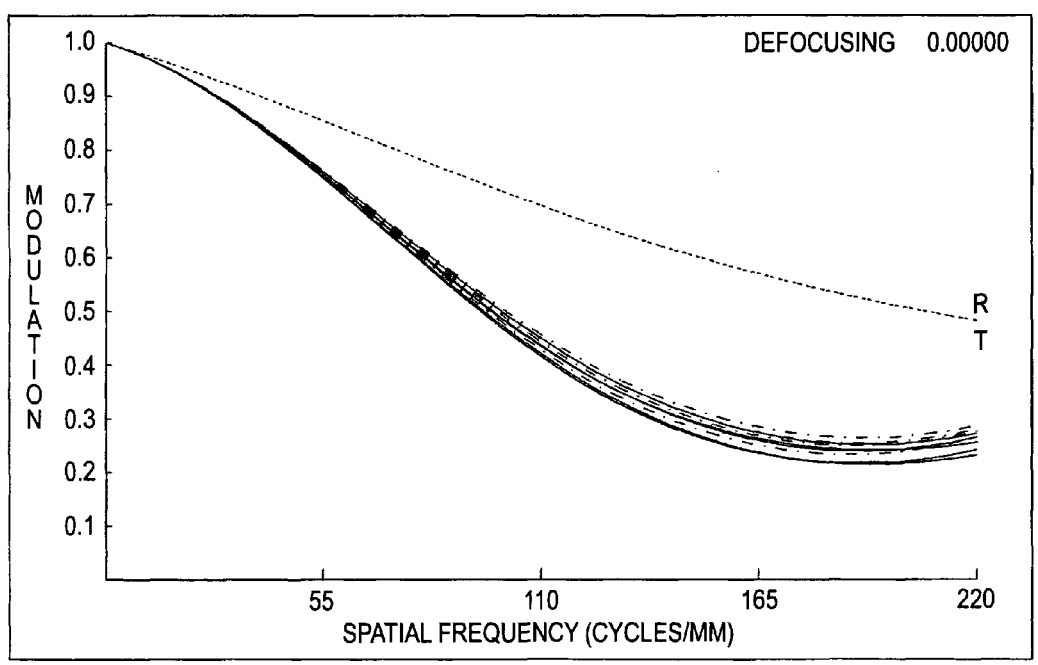
FIG. 23 is a graph showing the standard data of MTF characteristics of the first imaging apparatus without eccentricity, showing the results of investigation of an effect on resolution of the amount of eccentricity of the partition wall together with FIGS. 24 to 26.
Figure 24:
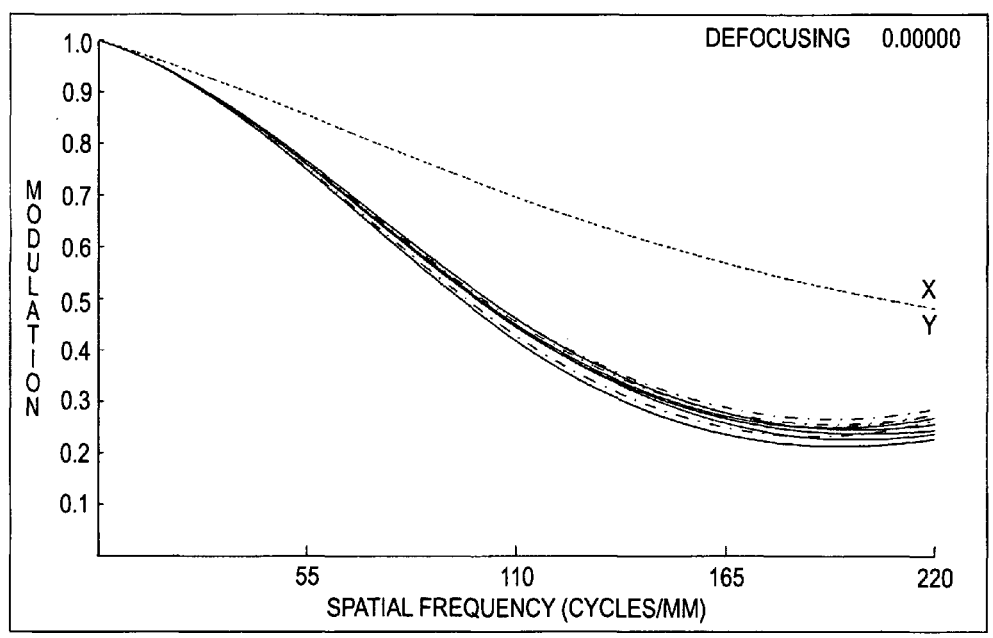
FIG. 24 is a graph showing the MTF characteristics of the first imaging apparatus when the partition wall has an amount of eccentricity of 30 μm.
Figure 25:
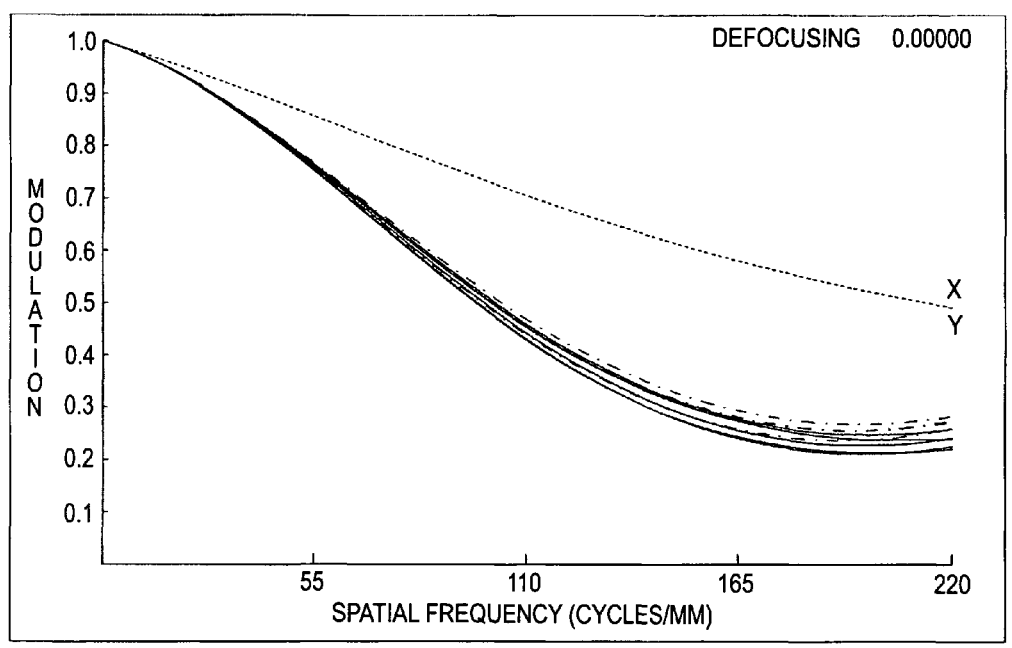
FIG. 25 is a graph showing the MTF characteristics of the first imaging apparatus when the partition wall has an amount of eccentricity of 60 μm.
Figure 26:
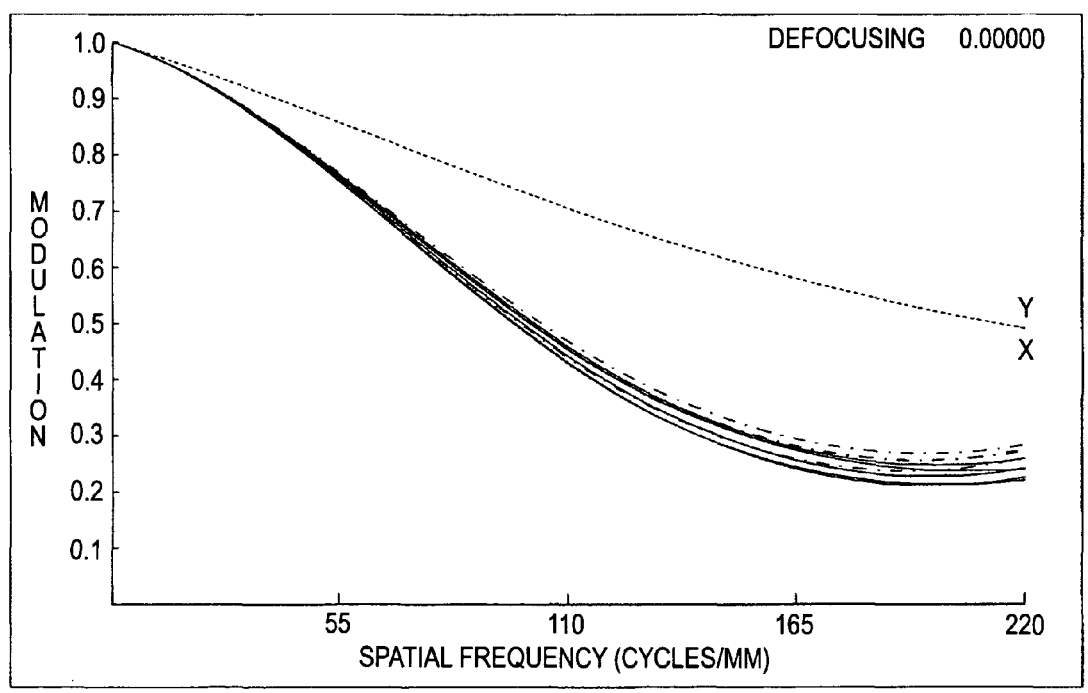
FIG. 26 is a graph showing the MTF characteristics of the first imaging apparatus when the partition wall has an amount of eccentricity of 90 μm.

FIGS. 23 to 26 are graphs showing the MTF characteristics when the position of the partition wall was changed, showing the relationship between the image height and the spatial frequency. Specifically, FIG. 23 is a graph when the center Q of the intersection of two partition walls is identical to the center P of the optically effective area S, that is when the amount of eccentricity is 0, and FIGS. 24, 25, and 26 are graphs when the amount of eccentricity is 30 μm, 60 μm, and 90 μm in both the X and Y directions.

The investigation was conducted in the tangential direction (T) and the radial direction (R) at each image height of 0%, 30%, 50%, 60%, and 70% with respect to each thickness of the partition wall.

The graph shown in FIG. 23 corresponds to the case when the amount of eccentricity was 0 μm in both the X and Y directions, showing the standard data for verifying the effect on resolution when the amount of eccentricity was changed.

As shown in FIGS. 24 to 26, when the amount of eccentricity was 30 μm, 60 μm, and 90 μm in both the X and Y directions, the MTF values showed little decrease compared to the standard data shown in FIG. 23.

As described above, in the imaging apparatus 100, it was confirmed that the MTF values showed little change compared to the standard data when the amount of eccentricity of the partition wall was 30 μm, 60 μm, and 90 μm, and the effect on resolution of the presence of the partition wall in the optically effective area S was very small when the amount of eccentricity of the partition wall was 90 μm or smaller.

Therefore, in the optical apparatuses 7, 7A, and 7B, by setting the amount of eccentricity of the center Q of the partition wall 9, 9B relative to the center P of the optically effective area S to be 90 μm or smaller, it is possible to obtain a good image or video in which the partition wall has little effect on resolution.

The specific shapes and structures described in the embodiment for implementing the present invention are merely examples to implement the present invention, and it is to be noted that the technical scope of the present invention should not be interpreted as limited by these examples.

The present application contains subject matter related to that disclosed in Japanese Priority Patent Application JP 2009-203854 filed in the Japan Patent Office on Sep. 3, 2009, the entire contents of which is hereby incorporated by reference.

What is claimed is:

1. An optical apparatus comprising:
a sealing case extending along and about an optical axis defining an optical axis direction and having a centrally-disposed partition wall having a partition wall thickness extending in a thickness direction being perpendicular to the optical axis direction and dividing the sealing case into a plurality of generally equally-sized chambers the optical axis extending through the partition wall thickness;
a polar liquid having polarity and a nonpolar liquid having no polarity which are respectively sealed in each of the chambers; and
a plurality of electrodes pulling the polar liquid by an electrowetting phenomenon upon application of a driving voltage, the plurality of electrodes including a central pair of electrodes and at least two peripheral pairs of electrodes, respective ones of the central pair of electrodes and the at least two peripheral pairs of electrodes being spaced apart from one another along the optical axis direction and being facially opposed to one another, the central pair of electrodes being disposed generally centrally between or among the at least two peripheral pairs of electrodes and being associated with each of the chambers,
wherein one of the polar liquid and the nonpolar liquid is colored with a color having a light-blocking property, and the other has a light-transmitting property,
at least a part of the partition wall is positioned in an optically effective space extending along and radially about the optical axis with the central pair of electrodes extending radially from and generally surrounding the optical axis to sandwich the optically effective space therebetween, and
when a driving voltage is applied to the pair of central electrodes, the polar liquid moves away from the at least two peripheral pairs of electrodes and inwardly towards the central pair of electrodes to occupy the optically effective space and, when the driving voltage is applied to the at least two peripheral pairs of electrodes, the polar liquid moves outwardly away from the central pair of electrodes and outwardly towards the at least two peripheral pairs of electrodes to vacate the optically effective space.

2. The optical apparatus according to claim 1, wherein the thickness of the partition wall is 30 μm or smaller.

3. The optical apparatus according to claim 1, wherein a distance between the optical axis and the center of a surface of the partition wall perpendicular to the optical axis is set to be 90 μm or smaller.

4. The optical apparatus according to claim 1, wherein the central pair of electrodes are used as common electrodes for the polar liquids sealed in the respective chambers.

5. An imaging apparatus comprising:
an image sensing device that generates an image by photoelectrically converting light incident thereto;
a sealing case extending along and about an optical axis defining an optical axis direction and having a centrally-disposed partition wall having a partition wall thickness extending in a thickness direction being perpendicular to the optical axis direction and dividing the sealing case into a plurality of generally equally-sized chambers, the optical axis extending through the partition wall thickness;
a polar liquid having polarity and a nonpolar liquid having no polarity which are respectively sealed in each of the chambers; and
a plurality of electrodes pulling the polar liquid by an electrowetting phenomenon upon application of a driving voltage, the plurality of electrodes including a central pair of electrodes and at least two peripheral pairs of electrodes, respective ones of the central pair of electrodes and the at least two peripheral pairs of electrodes being spaced apart from one another along the optical axis direction and being facially opposed to one another, the central pair of electrodes being disposed generally centrally between or among the at least two peripheral pairs of electrodes and being associated with each of the chambers,
wherein one of the polar liquid and the nonpolar liquid is colored with a color having a light-blocking property, and the other has a light-transmitting property,
at least a part of the partition wall is positioned in an optically effective space extending along and radially about the optical axis with the central pair of electrodes extending radially from and generally surrounding the optical axis to sandwich the optically effective space therebetween, and
when a driving voltage is applied to the pair of central electrodes, the polar liquid moves away from the at least two peripheral pairs of electrodes and inwardly towards the central pair of electrodes to occupy the optically effective space and, when the driving voltage is applied to the at least two peripheral pairs of electrodes, the polar liquid moves outwardly away from the central pair of electrodes and outwardly towards the at least two peripheral pairs of electrodes to vacate the optically effective space.

6. An optical apparatus comprising:

a sealing case extending along an about an optical axis defining a heightwise direction, a longitudinal axis defining a lengthwise direction and a transverse axis defining a widthwise direction, the optical axis, the longitudinal axis and the transverse axis intersecting one another a point of intersection and oriented perpendicularly relative to one another to define a conventional Cartesian coordinate system, the sealing case having N generally equally-sized chambers partitioned by a partition wall structure;

an operating liquid including a polar liquid having a polarity and a nonpolar liquid having no polarity which are respectively sealed in each of the chambers; and a plurality of electrodes including a central pair of electrodes spaced-apart from and facially-opposing one another in the heightwise direction and N peripheral pairs of electrodes, each one of the N peripheral pairs of electrodes spaced-apart from and facially-opposing one another in the heightwise direction, the operating liquid being positioned between the facially opposed ones of the central pair of electrodes and the number N of peripheral pairs of electrodes, the central pair of electrodes being disposed centrally between or among the N peripheral pairs of electrodes and defines a centrally-located optically effective space at least between the central pair of electrodes, respective ones of the N peripheral pairs of electrodes being disposed in respective ones of the N chambers, wherein the partition wall structure extends in the heightwise and widthwise direction with the optical axis extending generally centrally through the partition wall structure in the heightwise direction, wherein each one of the central pair of electrodes is divided into N electrode pieces and respective ones of facially-opposed N electrode pieces being disposed in a respective one of the chambers adjacent the partition wall structure and the optical axis in a manner that the N electrode pieces of each one of the central pair of electrodes are arranged in a manner to at least substantially surround the optical axis, wherein, when a driving voltage is applied to the pair of central electrodes, the polar liquid moves inwardly away from the N peripheral pairs of electrodes and towards the pair of central electrodes to occupy the optically effective space and, when the driving voltage is applied to the at least two peripheral pairs of electrodes, the polar liquid moves outwardly towards the N peripheral pairs of electrodes and away from the pair of central electrodes to vacate the optically effective space, and wherein N is an integer equal to at least 2.

7. The optical apparatus according to claim 6, wherein respective ones of the N peripheral pairs of electrodes are disposed substantially equidistantly apart from the optical axis.

* * * * *